United States Patent
Kanaoka et al.

(10) Patent No.: US 7,440,807 B2
(45) Date of Patent: Oct. 21, 2008

(54) CONTROL SYSTEM PROVIDED WITH VIRTUAL POWER MONITOR AND THEREBY PROVIDED WITH FUNCTION OF EVALUATING AND ANALYZING STABILITY OF OBJECT TO BE CONTROLLED

(75) Inventors: Katsuya Kanaoka, Kusatsu (JP);
Tsuneo Yoshikawa, Nara (JP)

(73) Assignee: The Ritsumeikan Trust, Kyoto (JP)

( * ) Notice: Subject to any disclaimer, the term of this patent is extended or adjusted under 35 U.S.C. 154(b) by 0 days.

(21) Appl. No.: 10/545,756

(22) PCT Filed: Feb. 16, 2004

(86) PCT No.: PCT/JP2004/001624

§ 371 (c)(1),
(2), (4) Date: Aug. 15, 2005

(87) PCT Pub. No.: WO2004/079462

PCT Pub. Date: Sep. 16, 2004

(65) Prior Publication Data

US 2006/0224253 A1    Oct. 5, 2006

(30) Foreign Application Priority Data

Feb. 14, 2003 (JP) ............... 2003-036056
Sep. 20, 2003 (JP) ............... 2003-366681

(51) Int. Cl.
G05B 11/01 (2006.01)
G06F 19/00 (2006.01)
G06F 3/033 (2006.01)
G09G 5/08 (2006.01)

(52) U.S. Cl. .................. 700/45; 700/19; 700/245; 345/157; 345/161

(58) Field of Classification Search ............. 700/1, 700/19, 20, 44, 45, 28, 83, 17, 22, 37; 702/180, 702/181, 182; 713/300, 340, 375; 703/2, 703/7

See application file for complete search history.

(56) References Cited

U.S. PATENT DOCUMENTS 5,963,447 A * 10/1999 Kohn et al. ............... 700/49

(Continued)

FOREIGN PATENT DOCUMENTS

JP    6-222839    8/1994
JP    10-268904   10/1998

OTHER PUBLICATIONS

Katsuya Kanaoka et al., Passivity Monitor and Software Limiter which Guarantee Asymptotic Stability of Robot Control System, Sep. 2003, IEEE, International Conference on Robotics & Automation, p. 4366-4373.*

(Continued)

*Primary Examiner*—Albert DeCady
*Assistant Examiner*—Sunray R Chang
(74) *Attorney, Agent, or Firm*—Jordan and Hamburg LLP

(57) ABSTRACT

A system configuration can evaluate the stability of an output from a user's control system including all effects of unknown dynamic characteristics and disturbances and can guarantee the stability of the output from the user's control system irrespective of the unknown dynamic characteristics and the disturbances. The control system is provided with a virtual power monitor and is thereby provided with a function of evaluation and analyzing the stability of an object to be controlled, and is such that in a user's control system the user's controlled object is controlled by the user's control strategy. Included is a conservative control strategy which receives a feedback signal from the user's controlled object and can input a control input to the user's controlled object; and a virtual power monitor which monitors power virtually transmitted from the conservative control strategy to the user's controlled object, and can evaluate the stability of an output from the user's control system.

5 Claims, 17 Drawing Sheets

U.S. PATENT DOCUMENTS

| | | | |
|---|---|---|---|
| 6,208,497 B1* | 3/2001 | Seale et al. | 361/160 |
| 6,362,737 B1* | 3/2002 | Rodgers et al. | 340/572.1 |
| 6,411,944 B1* | 6/2002 | Ulyanov | 706/13 |
| 6,559,708 B2* | 5/2003 | Notani | 327/537 |
| 6,615,091 B1* | 9/2003 | Birchenough et al. | 700/96 |
| 6,647,301 B1* | 11/2003 | Sederlund et al. | 700/79 |
| 6,813,525 B2* | 11/2004 | Reid et al. | 700/19 |
| 6,850,252 B1* | 2/2005 | Hoffberg | 715/716 |
| 6,868,538 B1* | 3/2005 | Nixon et al. | 717/100 |
| 6,878,066 B2* | 4/2005 | Leifer et al. | 463/39 |
| 6,983,227 B1* | 1/2006 | Thalhammer-Reyero | 703/2 |
| 7,027,965 B2* | 4/2006 | Hannaford et al. | 703/2 |
| 7,050,863 B2* | 5/2006 | Mehta et al. | 700/29 |
| 2004/0024750 A1* | 2/2004 | Ulyanov et al. | 707/3 |

OTHER PUBLICATIONS

Maschke B M J et al: "Energy-based Lyapunov functions for forced Hamiltonian systems with dissipation" Decision and Control, 1998. Proceedings of the 37th IEEE Conference on Tampa, FL, USA Dec. 16-18, 1998, Piscataway, NJ, USA, IEEE, US, vol. 4, Dec. 16, 1998, pp. 3599-3604, XP010643286 ISBN: 0-7803-4394-8.

Y. Liu et al: "Distributively controlling two robots handling an object in the task space without any communication" IEEE Transactions on Automatic Control, Oct. 1996, pp. 1193-1198, XP011000179 USA.

"Control Theory of Non-Linear Mechanical Systems—A Passivity-based and Circuit-theoretic Approach", by S. Arimoto, Oxford Science Publication, 1996.

"Bilateral Control with Energy Balance Monitoring Under Time-Varying communication Delay", by Y. Yokokohji, T. Imaida, and T. Yoshikawa, Proceedings of the 2000 IEEE International Conference on Robotics and Automation, p. 2684-2689, 2000.

"Control of a Flexible Manipulator with Noncollocated Feedback: Time Domain Passivity Approach", by J.H. Ryu, D.S. Kwon, and B. Hannaford, Control Problems in Robotics, Springer Tracts in Advanced Robotics, vol. 4, p. 121-134, 2003.

B. Hannaford. et al: "Time Domain Passivity Control of Haptic Interfaces"; Proceedings of the 2001 IEEE International Conference on Robotics and Automation, vol. 2, Seoul, Korea, May 21-26, 2001, pp. 1863-1869.

Y. S. Kim, et al.; "Some Practical Issues in Time Domain Passivity Control of Haptic Interfaces"; Proceedings of the 2001 IEEE/RSJ International Conference on Intelligent Robots and Systems. vol. 3, Maui, Hawaii, USA, Oct. 29-Nov. 3, 2001, pp. 1744-1750.

B. Hannaford, et al.; "Time-Domain Passivity Control of Haptic Interfaces"; IEEE Transaction on Robotics and Automation, vol. 18, No. 1, Feb. 2002, pp. 1-10.

J. Ryu, et al.; "Stable Teleoperation with Time Domain Passivity Control"; Proceedings of the 2002 IEEE International Conference on Robotics and Automation, vol. 3, Washington D.C., May 11-15, 2002. pp. 3260-3265.

J. Ryu, et al.; "Stability Guaranteed Control: Time Domain Passivity Approach"; Proceedings of the 2002 IEEE/RSJ International Conference on Intelligent Robots and Systems, vol. 3, Lausanne. Switzerland. Sep. 30-Oct. 5, 2002. pp. 2115-2121.

J. Ryu, et al; "Sampled and Continuous Time Passivity and Stability of Virtual Environments"; Proceedings of the 2003 IEEE International Conference on Robotics and Automation, vol. 1, Taipei. Taiwan, Sep. 14-19, 2003, pp. 822-827.

J. Ryu, et al.; "Time Domain Passivity control with Reference Energy Behavior"; Proceedings of the 2003 IEEE/RSJ International Conference on Intelligent Robots and Systems, vol. 3, Las Vegas. Nevada. Oct. 27-31, 2003, pp. 2932-2937.

J. Ryu, et al.; Time Domain Passivity Control for 6 Degrees of Freedom Haptic Displays; Proceedings of the 2003 IEEE/RSJ International Conference on Intelligent Robots and Systems, vol. 3, Las Vegas. Nevada. Oct. 27-31, 2003, pp. 2944-2949.

* cited by examiner

CONTROL SYSTEM PROVIDED WITH VIRTUAL POWER MONITOR AND THEREBY PROVIDED WITH FUNCTION OF EVALUATING AND ANALYZING STABILITY OF OBJECT TO BE CONTROLLED

TECHNICAL FIELD

The present invention relates to a common control system in a mechanical field, an electric and electronic field, a chemical field or the like. The present invention can be applied to a wide variety of control systems of, for example, robots, machine tools, automobiles, electric and electronic circuits, chemical plants and the like.

BACKGROUND ART

[Non-patent Document 1]
"Control Theory of Non-linear Mechanical Systems—A Passivity-based and Circuit-theoretic Approach", by S. Arimoto, Oxford Science Publication, 1996.

[Non-patent Document 2]
"Bilateral Control with Energy Balance Monitoring Under Time-Varying communication Delay", by Y. Yokokohji, T. Imaida, and T. Yoshikawa, Proceedings of the 2000 IEEE International Conference on Robotics and Automation, page 2684-2689, 2000.

[Non-patent Document 3]
"Control of a Flexible Manipulator with Noncollocated Feedback: Time Domain Passivity Approach", by J. H. Ryu, D. S. Kwon, and B. Hannaford, Control Problems in Robotics, Springer Tracts in Advanced Robotics, Vol. 4, page 121-134, 2003.

To secure the safety of a control system, it is necessary to guarantee that "an object to be controlled is not brought to an unstable state (does not run away out of control) under any conditions". On this account, it is common to add a hardware-like limiter (hardware limiter) to the control system.

On the other hand, passivity (for example, refer to non-patent document 1), which is the feature of a physical system, has received attention as a theoretical scheme to guarantee stability.

A system that monitors the energy balance of a specific system with attention given to passivity to limit accumulated energy to thereby secure stability is already proposed as energy balance monitor (non-patent document 2) and passivity observer/passivity controller (non-patent document 3). The conceptual diagram of these conventionally known systems is shown in FIG. 17.

By the way, evaluation criteria of the stability of a user's controlled object, which are used for determining the operation of a hardware limiter in a common control system, are the limitation of an operating range, the limitation of current and velocity for an actuator, and the like, which are rough in distinction between stability and instability. Moreover, there is also a possibility that once a limiter is activated in a system, the system is thereafter out of control and causes a secondary disaster. Even if the system does not come to cause a disaster, in many cases, it takes a great deal of time and labor to restart the system.

Further, the energy balance monitor of the non-patent document 2 secures the passivity of a transmission line between a master and a slave and the passivity observer/passivity controller of the non-patent document 3 secures the passivity of virtual space of a haptic system, respectively, but they do not guarantee the stability of a control system including an arbitrary control strategy, an arbitrary controlled object, and an arbitrary disturbance in a real world.

Still further, in the systems described in the non-patent documents 2, 3, on the assumption that the user's controlled object 3 is passive, the user's control strategy 5 is made virtually passive on the basis of the observation of energy balance to guarantee the stability of the whole system. However, if the user's controlled object 3 is not passive, the stability of the system cannot be guaranteed. Although most of the physical systems as the user's controlled object 3 are passive, the systems cannot cope with, for example, a situation where an actuator is connected in opposite polarity by mistake to operate opposite to a driving input. If not such an extreme example, the system cannot cope with also instability caused by disturbances having direct effect on the user's controlled object.

Therefore, it is an object of the present invention to provide a system configuration that can not be realized by a conventional technology, that is, keeps control performance as high as possible for a user's control system, which has its arbitrary user's controlled object controlled by an arbitrary user's control strategy and undergoes the effect of an arbitrary disturbance, and at the same time guarantees the stability of the user's controlled object.

Further, it is another object of the present invention to provide a system configuration that can evaluate the whole user's control system including all effects from the outside world and can guarantee the stability of the whole system.

Still further, it is still another object of the present invention to provide a system configuration that can guarantee the stability of a user's controlled object even if it is not assumed that the user's controlled object is passive.

DISCLOSURE OF THE INVENTION

The present inventors have found that the above-described object can be attained by forming a system configuration in which a function (passivity monitor) of monitoring the passivity of a control system to quantitatively evaluate the stability of the control system and an intelligent limiter function (software limiter) capable of suppressing only an unstable action without interrupting control at the time of detecting the unstable action are added to an existing system, and have invented the present invention.

Moreover, the present inventors have found the following facts: in place of "monitoring the passivity of the control system" to quantitatively evaluating the stability of a control system in the related art (passivity monitor), as will be described later, power (virtual power) virtually transmitted from a conservative control strategy to a user's controlled object is monitored to evaluate and analyze the stability of a user's control system (virtual power monitor), and in place of a software limiter of functioning in such a way as to prevent passivity from being lost according to the evaluation of passivity, as will be described later, a virtual power limiter is employed which tunes the user's control system by some means on the basis of the monitoring of the virtual power in the virtual power monitor to limit the outflow of the virtual power from the user's control system and thereby functions in such a way as to guarantee the stability of the user's control system, and if a virtual power limiter system including these "virtual power monitor" and "virtual power limiter" is added to the user's control system to form a system configuration, the control system that is provided with the above-described passivity monitor and is thereby provided with a function of evaluating and analyzing the stability of the object to be controlled can be further generalized as the virtual power limiter system for guaranteeing the stability of the control system and hence can be extended in the scope of application. Under this virtual power limiter system, the configuration of each control system paying attention to the above-described passivity (refer to the first embodiment to be described later) is one example in the case where the virtual power limiter system is designed on the basis of the concept of the passivity.

Moreover, according to the virtual power limiter system of the present invention, also in a power assist system for assisting the power of a human by the use of a robot, it is possible to limit power flowing out to the human from the power assist robot irrespective of the dynamic characteristics of the human being unknown and hence to secure safety to the human. A control system of the present invention capable of attaining the above object is (1) characterized in that in an existing system having a user's controlled object controlled by a user's control strategy, the control system includes: an internal control strategy, which receives a feedback signal from the user's controlled object and inputs a control input to the user's controlled object; and a passivity monitor, which monitors the passivity of a monitored system including the existing system from the input/output of the monitored system (shown in FIG. 1), and can evaluate and analyze the stability of the user's control system.

(2) In the control system of the present invention, the user's controlled object can be typified by a mechanical system including a robot, but is not limited to this. The present invention can be applied also to various kinds of system in an electric and electronic field, a chemical field, and the like.

(3) In the control system of the present invention, an input to the monitored system can be typified by force or torque and an output from the monitored system can be typified by velocity or angular velocity, but they are not limited to these. The input to the monitored system may be a physical quantity other than force or torque and the output from the monitored system may be a physical quantity other than velocity or angular velocity.

Examples of the other physical quantity are pressure and volume change in gas, water, oil, or the like; voltage input and current output; current input and voltage output; or the like. These inputs and outputs can be arbitrarily selected if they are a pair of physical quantities for which the passivity can be defined (conjugate power pair).

(4) In the control system of the present invention, a control input from the user's control strategy to the user's controlled object and a control input from the internal control strategy to the user's controlled object may be inputted to the user's controlled object by the same physical means or by different physical means (shown in FIG. 2). Examples of the different physical means can be typified by different motors in the same robot or the like.

(5) Moreover, in the control system of the present invention, the control input from the user's control strategy to the user's controlled object and the control input from the internal control strategy to the user's controlled object have the same dimension but these two control inputs may be different from each other in the dimension.

For example, in the case where the user's controlled object is a robot having six motors, the control system may be a control system such that the control input from the user's control strategy to the user's controlled object is expressed by six-dimensional vector to all six motors and that the control input from the internal control strategy to the user's controlled object is expressed by three-dimensional vector to three motors of the six motors.

(6) One condition of the internal control strategy in the present invention, as will be described later, is to be capable of guaranteeing stability to a passive system but even an internal control strategy not satisfying this definition can be employed as an internal control strategy by adding an appropriate limiter (for example, the first software limiter) to it.

Further, the present invention is such that includes a software limiter, which prevents the passivity of the monitored system from being lost (7) by tuning the quantity of negative feedback from the output of the monitored system to the input of the monitored system (the second software limiter, shown in FIG. 3) or (8) by tuning the control input from the user's control strategy to the user's controlled object (the third software limiter, shown in FIG. 4) in the monitored system according to the evaluation of passivity by the passivity monitor and thereby guarantees the stability of the output from the monitored system.

(9) Still further, the present invention is such that includes a software limiter, which tunes the control input from the internal control strategy to the user's controlled object in the monitored system according to the evaluation of passivity by the passivity monitor (the fourth software limiter, shown in FIG. 5) and thereby guarantees the stability of the output from the monitored system and keeps controlling the user's controlled object.

(10) By appropriately determining a tuning strategy by the above-mentioned software limiter, it is possible to quantitatively and arbitrarily determine the extent to which the instability of the internal control strategy is allowed, the extent to which the instability of the user's controlled object is allowed, the extent to which the passivity of the monitored system is recovered quickly, or the extent to which the internal control strategy is substituted for the user's control strategy.

(11) In addition, by applying tuning by the above-described software limiter to the gains of the quantity of negative feedback from the output of the monitored system to the input of the monitored system, the user's control strategy, or the internal control strategy, it is also possible to automatically tune at least any one of the gains of the quantity of negative feedback, the user's control strategy, or the internal control strategy in such a way that the stability of the output from the monitored system is guaranteed.

Moreover, the present invention is characterized in that a control system provided with the above-described passivity monitor and thereby provided with a function of evaluating and analyzing the stability of an object to be controlled is further generalized as a virtual power limiter system for guaranteeing the stability of the control system, thereby being extended in the scope of application.

The above-described generalized control system of the present invention is (12) characterized in that in a user's control system in which a user's controlled object is controlled by a user's control strategy, the control system includes: a conservative control strategy, which receives a feedback signal from the user's controlled object and can input a control input to the user's controlled object; and a virtual power monitor, which monitors power virtually transmitted from the conservative control strategy to the user's controlled object, and can evaluate and analyze the stability of the user's control object.

Further, the control system of the present invention is characterized in that the control system further includes a virtual power limiter, which (13) tunes the quantity of negative feedback from the output from the user's control system to an input to the user's controlled object or (14) tunes a control input from the user's control strategy to the user's controlled object in the user's control system on the basis of the monitoring of virtual power in the virtual power monitor to thereby limit the outflow of the virtual power from the user's control system to a virtual power monitor system, and thereby guarantees the stability of the output from the user's control system.

(15) Still further, the control system of the present invention is characterized in that the control system further includes a virtual power limiter, which tunes a control input from the conservative control strategy to the user's controlled object in the user's control system on the basis of the monitoring of virtual power in the virtual power monitor, and thereby guarantees the stability of the output from the user's control system and keeps controlling the user's controlled object.

(16) In addition, according to the present invention, by applying tuning by the virtual power limiter to the gain of the quantity of negative feedback from the output of the user's control system to the input to the user's controlled object, the user's control strategy, or the conservative control strategy, it is also possible to automatically tune at least one of the gains of the quantity of negative feedback, the user's control strategy, or the conservative control strategy in such a way that the stability of the output of the user's control system is guaranteed.

Next, the above-described virtual power limiter system can be applied also to a power assist system for assisting the power of a human by the use of a robot. (17) A control system of the present invention constructed at this time is characterized in that the control system includes: a power assist system (corresponding to the above-described user's control system), which has a user's controlled object controlled by an operator and includes a power assist control strategy (corresponding to the above-described user's control strategy) that receives a feedback signal from the user's controlled object and assists to input a control input from the operator to the user's controlled object; and a virtual power monitor that monitors power transmitted from the operator to the user's controlled object, and can evaluate and analyze the stability of the user's controlled object.

Further, the control system of the present invention is characterized in that the control system further includes a virtual power limiter, which (18) tunes the quantity of negative feedback from the output from the power assist system to an input to the user's controlled object or (19) tunes a control input from the power assist control strategy to the user's controlled object in the power assist system on the basis of the monitoring of virtual power in the virtual power monitor to limit the outflow of the virtual power from the power assist system to a virtual power monitor system, and thereby limits power flowing out of the power assist system to the operator to guarantee the stability of the output from the power assist system to thereby secure safety to the operator.

(20) In addition, according to the present invention, by applying tuning by the virtual power limiter to the quantity of negative feedback from the output of the power assist system to the input to the user's controlled object, or to the power assist control strategy, it is also possible to automatically tune the gain of at least one of the quantity of negative feedback and the power assist control strategy in such a way that the stability of the output of the power assist system to secure safety to an operator is guaranteed.

Hereafter, technical terms to be used for the description of the present invention will be defined.

First, the definition of "passivity" is given. Assume that an input vector u(t) and an output vector y(t) of a certain system have the same dimension (both of them may be scalars) where t=0 is the initial time and t is the present time. At this time, the following inequality is satisfied, it is said that the system satisfies passivity (or is passive). However, in the inequality (1), $\gamma_0^2$ is a bounded positive constant and commonly expresses internal energy at the initial time t=0 of the system.

$$\int_0^t y^T(\tau)u(\tau)d\tau \geq -\gamma_0^2 (\forall t > 0) \tag{1}$$

"Conjugate power pair" mean a pair of physical quantities for which passivity can be defined as the input/output of a system. Examples of a conjugate power pair include force and velocity, torque and angular velocity, voltage and current, and the like. In the present invention, assume that even if the system does not always satisfy passivity in reality, a pair of physical quantities for which passivity can be defined is called a conjugate power pair.

"User's controlled object" means a physical system specified by the user of the present invention. An arbitrary system can be a user's controlled object if the system has at least a conjugate power pair as a pair of input and output. However, the user's controlled object is not necessarily passive.

"User's control strategy" means a control strategy that the user of the present invention arbitrarily specifies to control the user's controlled object. The input and output between the user's control strategy and the user's controlled object are not necessarily a conjugate power pair but can be arbitrary physical quantities selected by the user.

"Existing system" means a system in which the user's control strategy inputs a control input to the user's controlled object to control the user's controlled object. An arbitrary unknown disturbance can be input to the existing system.

In this regard, assume that "existing system" does not include the constituent elements of weights of an internal control strategy, a passivity monitor, a software limiter, and the like, which will be described later.

"Monitor system" means a system which outputs a control input from the internal control strategy to the user's controlled object and to which feedback from the user's controlled object to the internal control strategy is inputted. The monitor system can be completely externally added to an arbitrary existing system.

When the present invention will be described below, assume that the monitor system includes not only an internal control strategy but also a passivity monitor.

"Monitored system" means a system to which a control input from the internal control strategy to the user's controlled object is inputted and which outputs feedback from the user's controlled object to the internal control strategy. The monitored system includes all sections not included in the monitor system (existing system, disturbance, and the like) and becomes an object whose passivity is monitored by a passivity monitor.

"Internal control strategy" means a control strategy that feeds back the output from the user's controlled object and inputs a control input to the user's controlled object to be able to guarantee the stability of the output when the user's controlled object is passive for the input and the output. Hence, the input and output between the internal control strategy and the user's controlled object needs to be a conjugate power pair. The same physical quantities or absolutely independent physical quantities may be selected for the input and output between the internal control strategy and the user's controlled object and the input and output between the user's control strategy and the user's controlled object.

"Passivity monitor" means a means for monitoring the passivity of the monitored system for a control input from the internal control strategy with the aid of the input and output between the monitor system and the monitored system.

"Software limiter" means a system constituent element that imposes some limit to at least one section of the control system to contribute to guaranteeing the stability of the output of the user's controlled object with control performance held as high as possible. Software limiters in one embodiment of the present invention to be described below include the first to fourth software limiters.

Moreover, technical terms to be used for description of the generalized present invention will be provided.

"User's control system" means a system to which a control input from a conservative control strategy to a user's controlled object is inputted and which outputs feedback from the user's controlled object to the conservative control strategy. The user's control system becomes an object to be monitored by a virtual power monitor system.

This "user's control system" is, by definition, the same as the above-mentioned "monitored system" and is a concept capable of including not only the existing system but also the weight of the virtual power limiter and the like. The user's control system can have an arbitrary unknown disturbance inputted thereto.

"Conservative control strategy" means a control strategy that can guarantee the stability of an arbitrary controlled object satisfying some condition (for example, passivity). Moreover, the conservative control strategy can feed back an output from a user's controlled object and can input (virtually connect) a control input to the user's controlled object. For example, when a virtual power limiter system is designed on the basis of passivity, the input and output between the conservative control strategy and the user's controlled object are a pair of physical quantities that can be a conjugate power pair. The conservative control strategy can be provided independently of the user's control strategy and corresponds to the above-described "internal control strategy".

In this regard, "virtual connection (or virtually connect)" means as follows: for example, when viewed from a virtual power monitor system, as shown in FIG. 8, a control input $u_{csv}$ from a conservative control strategy 104 indeed seems to be connected to a user's control system 2 but, in reality, is subjected to a weight $W_{csv}$ in the user's control system 2 (inside surrounded by a broken line in FIG. 8) and the weight $W_{csv}$ is usually reduced to zero (is not connected); therefore, this is called "virtual connection".

Moreover, only when an unstable condition occurs and the conservative control strategy needs to substitute for the control function of the user's control strategy, this control input $u_{csv}$ is actually connected to the user's controlled object. However, even if the control input $u_{csv}$ is actually connected to the user's controlled object, unless the weight $W_{csv}=1$, power $P_v$ monitored by a virtual power monitor 110 is different from the quantity of power actually flowing into a user's controlled object 3. Hence, the expression of "virtual" is used also in this sense.

Therefore, the above-described "virtual connection" expresses that a control input $u_{csv}$ is at least in a state where the control input $u_{csv}$ can be actually inputted although it is not certain that the control input $u_{csv}$ is actually inputted.

"Virtual power" means power virtually transmitted from the conservative control strategy to the user's controlled object.

"Virtual power monitor" means a means that monitors power (virtual power) transmitted from the conservative control strategy to the user's controlled object with the aid of the input and output between the virtual power monitor system and the user's control system to thereby evaluate and analyze the stability of the user's control system and corresponds to the above-described "passivity monitor".

"Virtual power limiter" means a system constituent element that tunes the user's control system by some means on the basis of the monitoring of virtual power by the virtual power monitor to limit the outflow of the virtual power from the user control system to thereby guarantee the stability of an output from the user control system and corresponds to the above-described "software limiter".

Moreover, a virtual power monitor system to be described next and this virtual power limiter are generically called a virtual power limiter system.

"Virtual power monitor system" means a system, which outputs a control input from the conservative control strategy to the user's controlled object and to which feedback from the user's controlled object to the conservative control strategy is inputted, and corresponds to the above-described "monitor system". The virtual power monitor system can be so constructed as to be completely externally added to an arbitrary user's control system.

When the present invention will be described below, assume that the virtual power monitor system includes not only the conservative control strategy but also the virtual power monitor.

As described above, the present invention provides a system construction that can be so constructed as to be completely externally added to an arbitrary existing system and quantitatively evaluates the stability of an output from an arbitrary user's control system on the basis of the monitoring of virtual power by a virtual power monitor and further guarantees the stability of an output from the user's control system. According to the present invention, it is possible to enhance the performance of the user control system as much as possible or to hold its performance as high as possible within a range in which stability can be held.

The conceptual diagram of the above-described virtual power monitor system of the present invention is shown in FIG. 8. The whole of a user's control system 2' is one monitored object and the conservative control strategy 104 designed independently of a user control strategy 5 is virtually connected to the input and output of the user's control system 2'. By monitoring virtual power passing this connection, it is possible to evaluate the whole of the user control system 2' including all effects from the outside world and to guarantee the stability of the output from the user control system 2'. Moreover, because the virtual power limiter system of the present invention is not predicated on the passivity of the user's controlled object, it is possible to guarantee the stability of the output from the user control system 2' even if the above-described actuator of opposite polarity and disturbance exist.

In addition, a system having a plurality of control strategies, like the present invention, has other advantages. The user control strategy 5 can be an aggressive control strategy pursuing only control performance. That is, even a control strategy that is not necessarily passive is allowed if it can enhance control performance. A conservative control strategy is not related to control if it is virtually connected and hence control performance does not need to be taken into account for the design of the conservative control strategy.

On the other hand, an existing system is going to secure the passivity of the user's control strategy itself and hence cannot essentially realize only more conservative control performance.

In this manner, the present invention is very useful and widely applicable and can be easily mounted. In particular, the present invention is very useful for a user's control system that is required to guarantee stability with reliability irrespective of requiring a high degree of control or a high degree of tuning of gain.

Hereafter, the present invention will be described in more detail.

BEST MODE FOR CARRYING OUT THE INVENTION

1. First Embodiment

Hereafter, one embodiment and its operation of the present invention in a robot control system, which is a typical example of the object to which the present invention is applied, will be described on the basis of FIG. 1 to FIG. 7. A control system 1 in accordance with the present invention is characterized mainly in that a passivity monitor and a software limiter are added to an existing system ex. First, 1) the reason why the stability of a control system can be quantitatively evaluated by a passivity monitor will be described, and then 2) the reason why the stability of an output of a monitored system can be guaranteed by a software limiter will be described.

Figure 1:
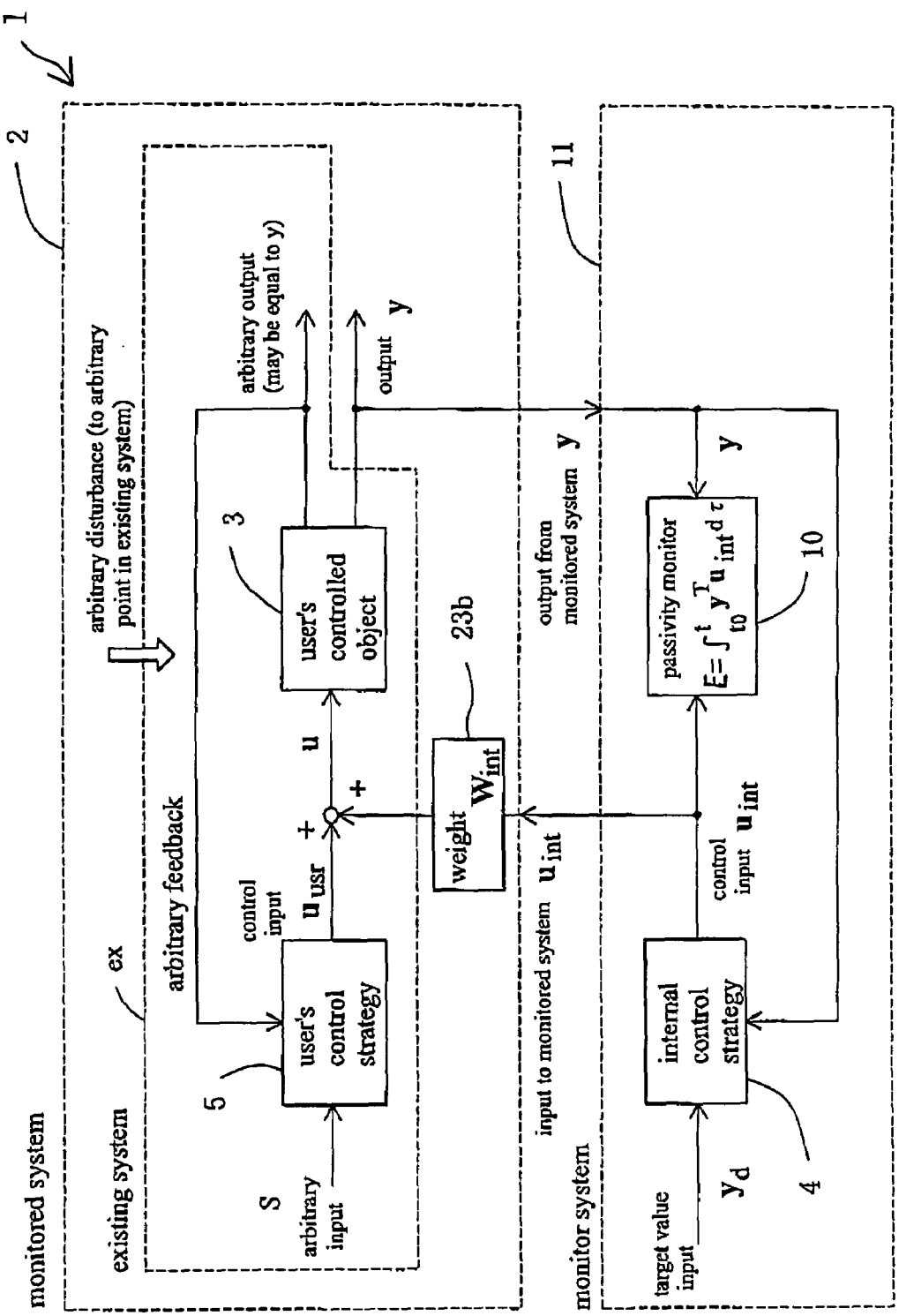
FIG. 1 is a diagram showing one example of a control system of the present invention.
Figure 2:
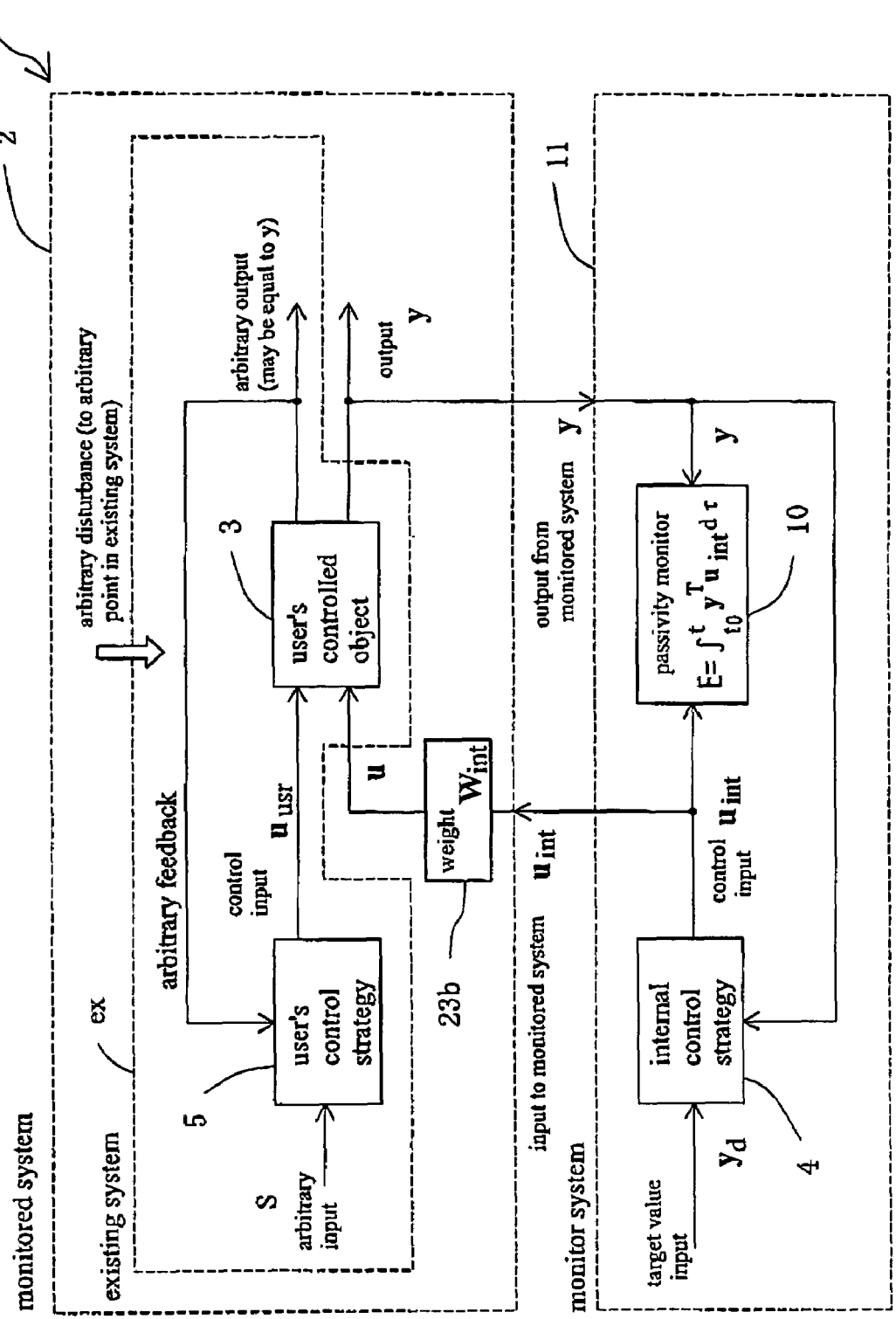
FIG. 2 is a diagram showing another example of the control system of the present invention.
Figure 3:
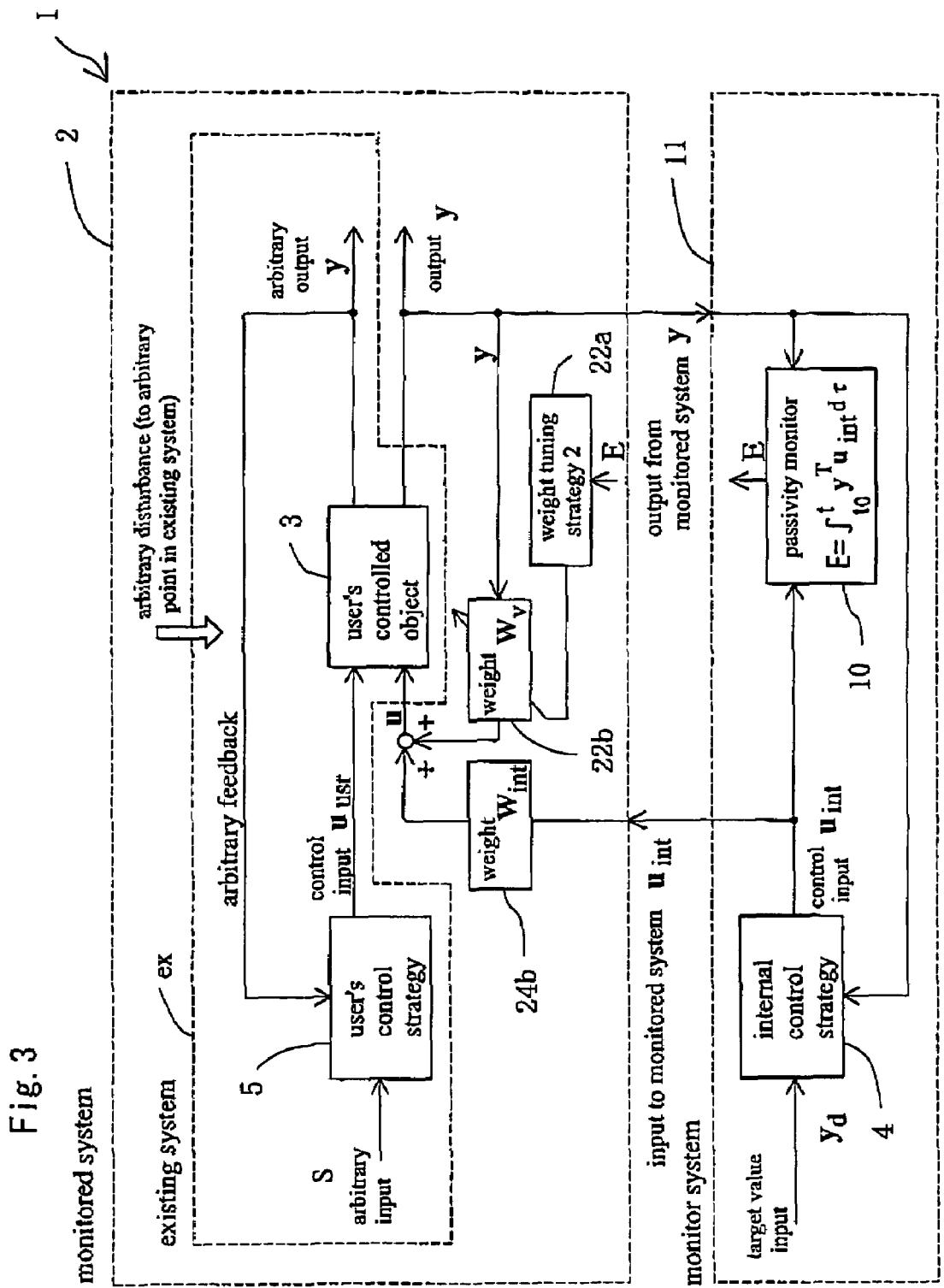
FIG. 3 is a diagram showing still another example of the control system of the present invention.
Figure 4:
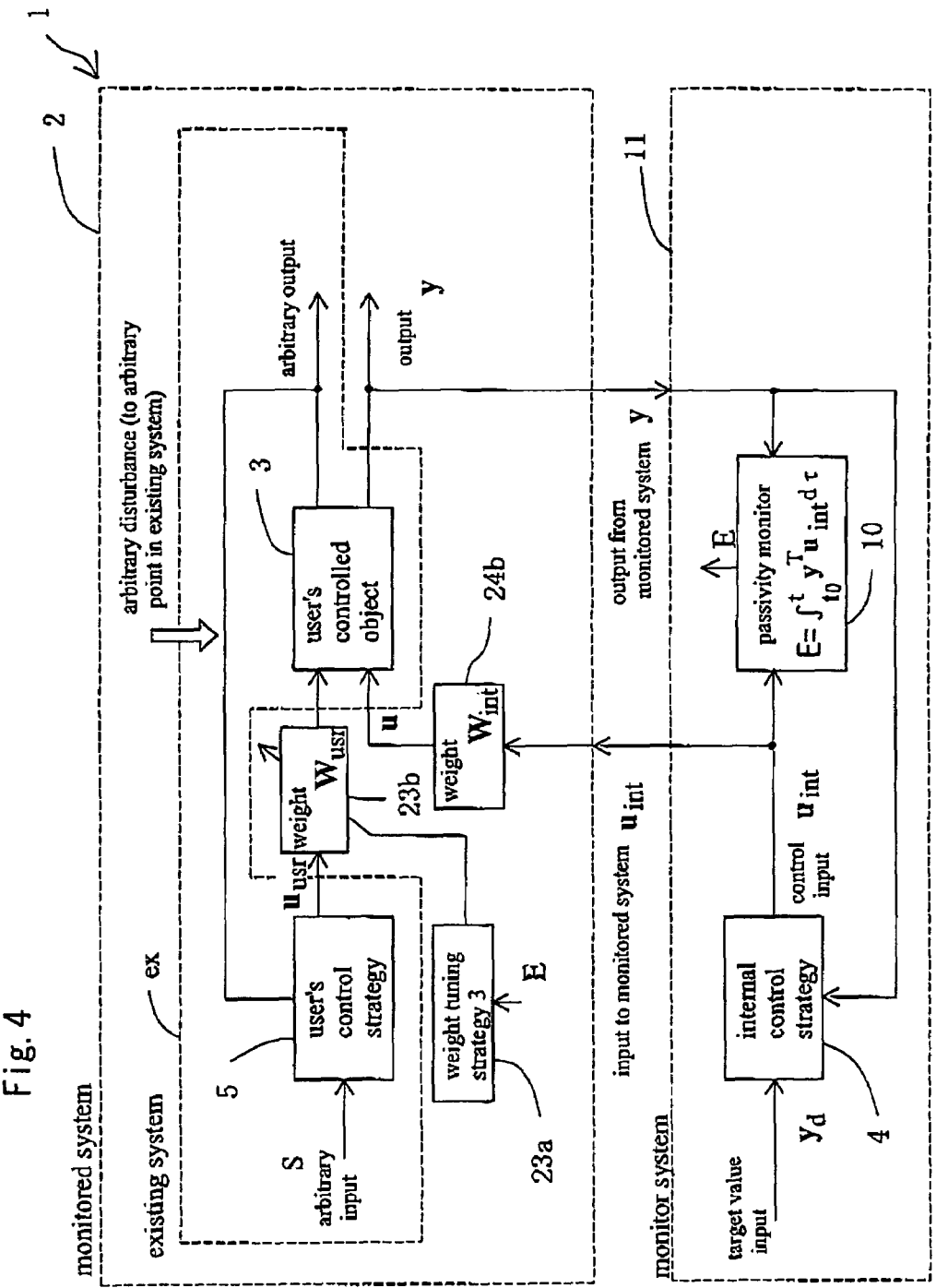
FIG. 4 is a diagram showing still another example of the control system of the present invention.
Figure 5:
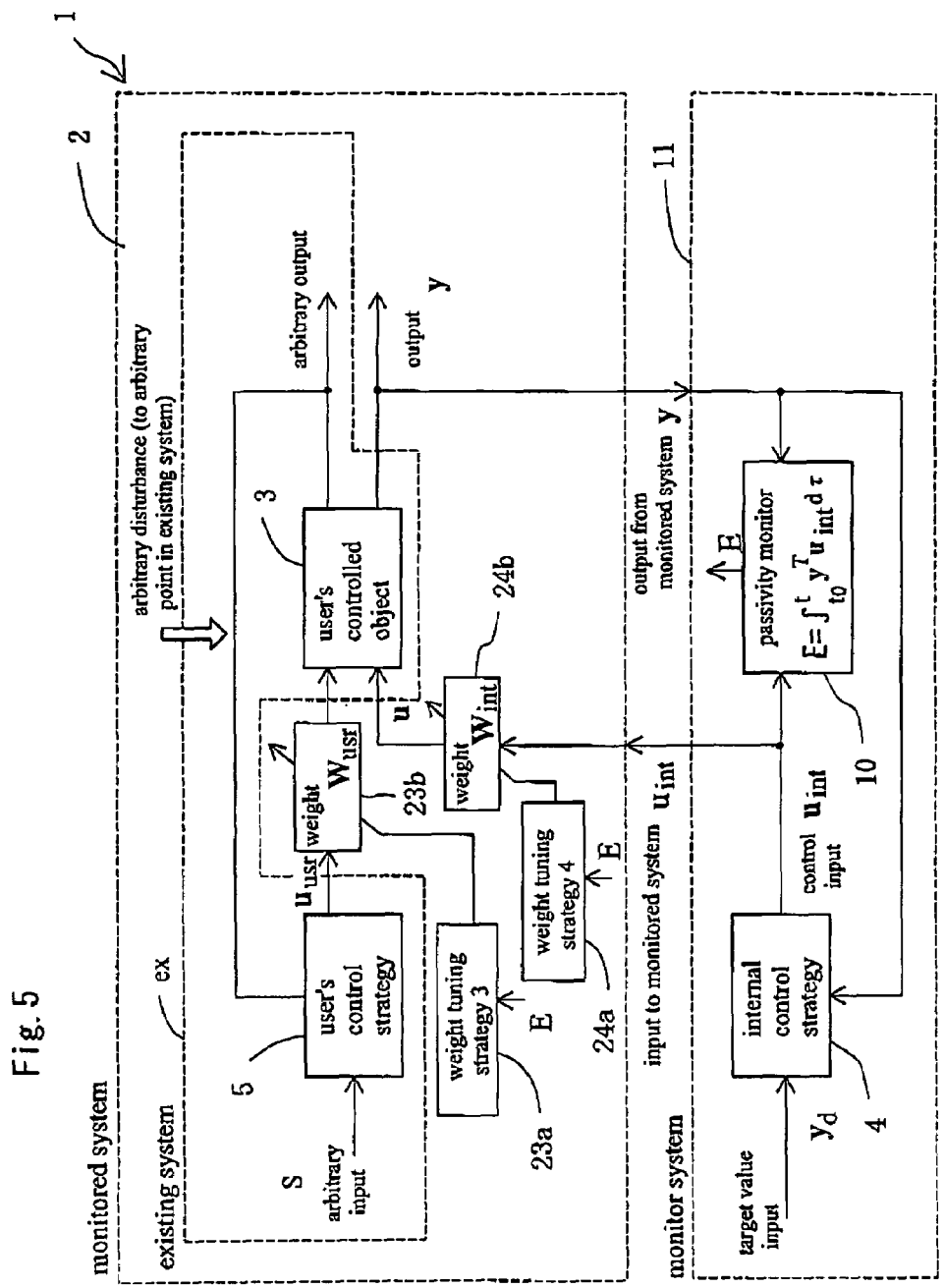
FIG. 5 is a diagram showing still another example of the control system of the present invention.
Figure 6:
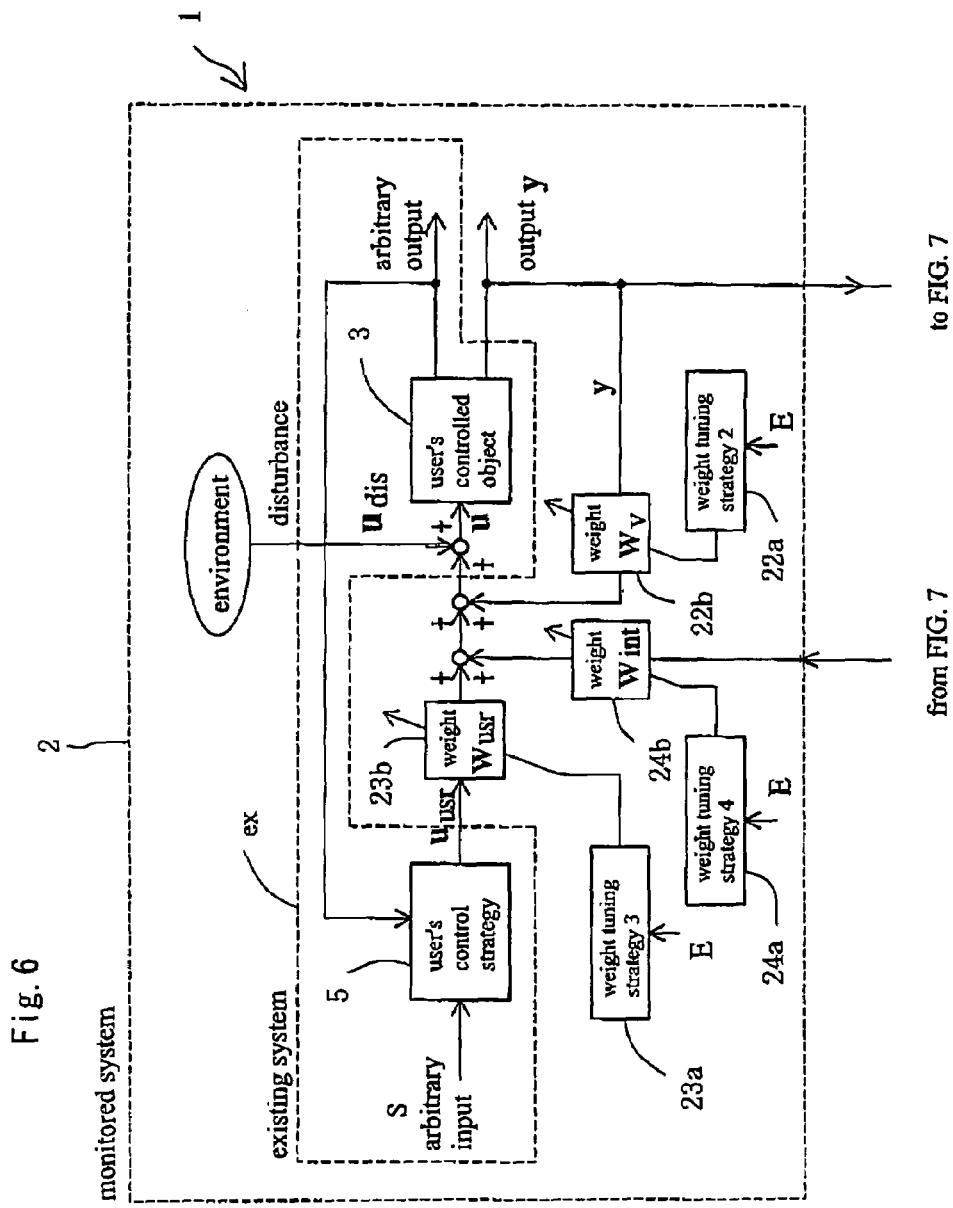
FIG. 6 is a diagram showing a monitored system of the control system of the present invention.
Figure 7:
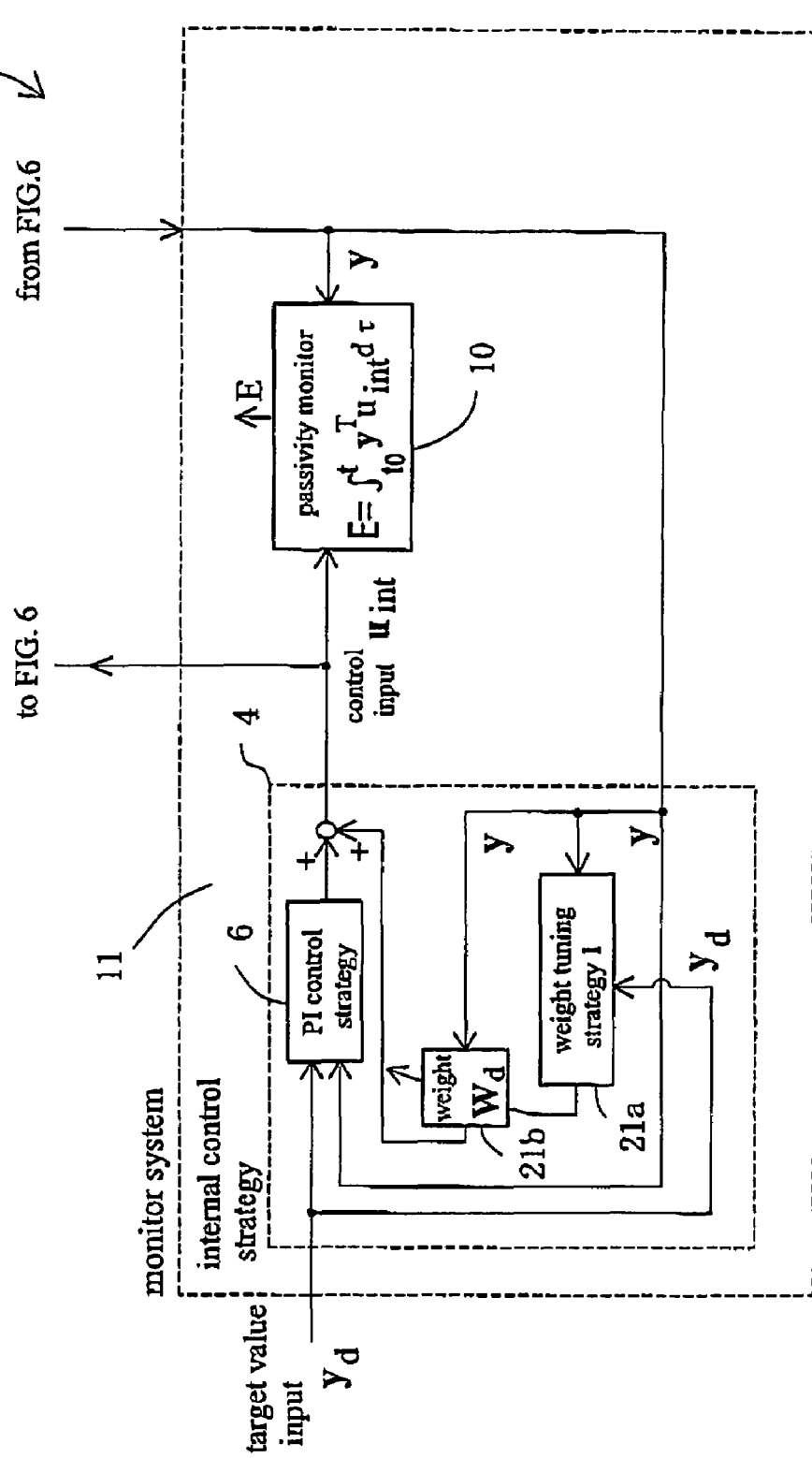
FIG. 7 is a diagram showing a monitor system of the control system of the present invention.

Here, FIG. 1 to FIG. 5 show individual configurations of a passivity monitor 10 and software limiters (21a, 21b to 24a, 24b). Moreover, the respective constituent elements shown in FIG. 6 and FIG. 7 construct the control system 1 of the present invention in combination. FIG. 1 shows a control system 1 in which a monitor system 11 including an internal control strategy 4 and the passivity monitor 10 of the present invention is added to the existing system ex. FIG. 2 shows a case in which two control inputs are inputted to a user's controlled object 3 by different physical means in the control system shown in FIG. 1. FIG. 3 shows a case in which a second software limiters (22a, 22b) of the present invention are applied to the control system shown in FIG. 1. FIG. 4 shows a case in which a third software limiters (23a, 23b) of the present invention are applied to the control system 1 shown in FIG. 1. FIG. 5 shows a case in which the third software limiters (23a, 23b) and the fourth software limiters (24a, 24b) of the present invention are applied to the control system 1 shown in FIG. 1. FIG. 6 and FIG. 7 are diagrams showing the construction of the whole control system 1 of the present invention in which the existing system ex is provided with an internal control strategy 4, the passivity monitor 10, and the first to fourth software limiters (21a, 21b to 24a, 24b). The first software limiters (21a, 21b), as shown in FIG. 7, are provided in the internal control strategy 4. The first software limiters (21a, 21b) include a weight tuning strategy 21a and a weight 21b ($W_d$). The weight $W_d$ is connected to and controlled by the weight tuning strategy 21a. A target value input $y_d$ and the output y of the user's controlled object 3 are inputted to the weight tuning strategy 21a. The output y of the user's controlled object 3 is connected to the weight $W_d$. An output from the weight $W_d$ is inputted as output from the internal control strategy 4 to the passivity monitor 10 and the monitored system 2 in FIG. 6 together with output from a control strategy 6 of a PI control strategy or the like. The first software limiters built in the internal control strategy 4 can be applied also to the control system 1 shown in FIG. 1 to FIG. 5. In the following description, assume that the first software limiters (21a, 21b) are built in the internal control strategy 4 shown in FIG. 1 to FIG. 5.

[Passivity Monitor]

First, the passivity monitor of the present invention will be described on the basis of FIG. 1. The control system 1 shown in FIG. 1 is constructed of: a monitored system 2 including an existing system ex in which a user's controlled object 3 is controlled by an arbitrary user's control strategy 5; and a monitor system 11 including an internal control strategy 4 capable of inputting a control input to the user's controlled object 3 and a passivity monitor 10 of a means for monitoring the passivity of the monitored system with the aid of an input and an output to and from the monitored system 2. An input S which the user determines to realize a target value $y_d$ can be inputted from the outside to the user's control strategy 5 and arbitrary feedback can be inputted to the user's control strategy 5 from the user's controlled object 3. An output (control input) $u_{usr}$ from the user's control strategy 5 and a control input $u_{int}$ from the internal control strategy 4 are inputted to the user's controlled object 3. An output y from the user's controlled object 3 is inputted to the passivity monitor 10 and the internal control strategy 4. In addition, the target value input $y_d$ can be inputted to the internal control strategy 4. The control input $u_{int}$ from the internal control strategy 4 is inputted to the passivity monitor 10 and is inputted via a weight $W_{int}$ to the user's controlled object 3. In the case of only monitoring passivity, a weight 24b ($W_{int}$) may be a constant.

Here, by setting $W_{int}=0$, it is possible to prevent the externally added monitor system 11 from having an effect on the existing system ex.

Moreover, the control input from the user's control strategy 5 to the user's controlled object 3 and the control input from the internal control strategy 4 to the user's controlled object 3 may be inputted to the user's controlled object 3 by the same physical means or by different physical means, and a case where the control input is inputted to the user's controlled object 3 by different physical means is shown in FIG. 2. This holds for the systems shown in FIG. 3 to FIG. 5 and FIG. 14.

Let's think a robot having n degrees of freedom (having n rotary motors) as the user's controlled object 3 in FIG. 1. Assume that the joint driving torque and the joint displacement of this robot are u(t) and q(t), respectively. Let's think of controlling this robot on a target trajectory $q_d(t)$. Here, u(t), q(t), and $q_d(t)$ are n-dimensional vectors, respectively. At this time, an input to the user's controlled object 3 is the joint driving torque u(t) and the output y(t) from the user's controlled object 3 is expressed by a joint angular velocity, as will be described below. The output $y_d(t)$ is a target trajectory of the joint angular velocity. Moreover, in the control system of the present invention, assume that all values except for time t are bounded.

$$y = \frac{dq}{dt}, y_d = \frac{dq_d}{dt} \tag{2}$$

When the present invention is applied to an existing system ex constructed of the above-described user's controlled object 3 and a user's control strategy 5 appropriately determined therefor, there are provided the systems shown in FIG. 1 to FIG. 5, or FIG. 6 and FIG. 7. In this system, the internal control strategy 4 is defined as follows.

$$u_{int} = -K_d y - K_P \int_0^t (y - y_d) d\tau - W_d y \tag{3}$$

This becomes a PI control strategy with respect to y. However, when thinking about q, this equation can be considered as a PD control strategy as shown by the following equation (4).

$$u_{int} = -K_P(q - q_d) - K_d \frac{dq}{dt} - W_d \frac{dq}{dt} \tag{4}$$

$$= -K_P(q - q_d) - K_d y - W_d y \tag{5}$$

Hereafter, in order to simplify expression, the internal control strategy 4 is expressed by equation (5). Here, $u_{int}$ is an n-dimensional vector showing a control input from the internal control strategy 4. $K_p$ is a diagonal matrix with n rows and n columns showing a proportional gain with respect to q. $K_d$ is a diagonal matrix with n rows and n columns showing a differential gain with respect to q. $W_d$ is a diagonal matrix with n rows and n columns showing an tuning factor 21*b* (weight) of the first software limiters (21*a*, 21*b*) of the present invention built in the internal control strategy 4. The software limiter will be described later.

The passivity monitor provided by the present invention is such that monitors the accumulated energy of the whole monitored system 2 of an object to provide the evaluation criterion of the stability of the control system including the arbitrary user's control strategy 5 and arbitrary environment such as disturbance. In order to evaluate the stability of the control system, the present inventors have firstly found a characteristic that a passive system is made asymptotically stable by PD control and then have found that if the passivity of the monitored system 2 is satisfied, the output y of the system can be said to be asymptotically stable. Hence, by monitoring the passivity of the monitored system 2, it is possible to provide the evaluation criterion of the stability of the system.

Here, a passivity monitor 10 in accordance with the present invention can be expressed as follows, $$E = \int_0^t y^T(\tau) u_{int}(\tau) d\tau \tag{6}$$

where E shows the internal accumulated energy of the monitored system 2. From the equation (1) of defining passivity, if the following inequality is satisfied, the monitored system can be said to be passive. $E_0$ is the initial internal energy of the monitored system appropriately determined by the user.

$$E \geq -E_0 \tag{7}$$

Hereafter, let's think the physical meaning of evaluating E by equation (7) in the passivity monitor 10 of the present invention. From equations (5) and (6), $$-E = \int_0^t y^T K_P(q - q_d) d\tau + \int_0^t y^T K_d y d\tau + \int_0^t y^T W_d y d\tau \tag{8}$$

$$= \int_0^t y_e^T K_P q_e d\tau - \int_0^t y_d^T K_P q_e d\tau + \int_0^t y^T K_d y d\tau + \int_0^t y^T W_d y d\tau$$

where $q_e$ and $y_e$ are defined as errors from the target values in the following manner.

$$q_e = q_d - q, \; y_e = y_d - q \tag{9}$$

Here, for convenience, when the PD control with respect to q of the internal control strategy 4 is regarded as a spring damper, the potential energy of the spring of P control is expressed by the following equation.

$$E_p(t) = \frac{1}{2} q_e^T(t) K_p q_e(t) \tag{10}$$

From equations (8) and (10), equation (7) expressing the passivity of the monitored system 2 is found to be equivalent to the following equation, where $E_{p0} = E_p(0)$.

$$E_p + \int_0^t y^T K_d y d\tau \leq E_{p0} + E_0 + \int_0^t y_d^T (K_P q_e) d\tau - \int_0^t y^T W_d y d\tau \tag{11}$$

Here, let's think that the above-described tuning strategy 21*a* of the weight $W_d$ is determined for an appropriately determined constant $E_{pmax}$ by the following inequality (12). By thinking in this manner, even if the internal control strategy 4 applied to the monitored system 2 varies with time or even if an excessive target value input $y_d$ is inputted at some timing to the internal control strategy 4, the first software limiter operates to increase weight $W_d$, thereby guaranteeing the stability of the output y of the monitored system 2 as is the case where the internal control strategy 4 does not vary with time.

$$E_{p0} + E_0 + \int_0^t y_d^T (K_P q_e) d\tau \le E_{pmax} + \int_0^t y^T W_d y d\tau \quad (12)$$

All variables except for time t are bounded and hence with the passage of time, the weight $W_d$ that always satisfies the above inequality can be determined. At this time, from equations (11) and (12), the following inequality can be obtained.

$$E_p + \int_0^t y^T K_d y d\tau \le E_{pmax} \quad (13)$$

The first term on the left side of equation (13) is potential energy accumulated in the spring of P control at time t, and the second term is the total quantity of energy dissipated by the damper of D control. When this inequality is satisfied, the energy dissipated by the damper is surely positive and monotonously increases and its upper value is limited by the constant $E_{pmax}$ on the right side. Hence, it is found that the potential energy of the first term on the left side decreases asymptotically. That is, if the monitored system 2 is monitored by the passivity monitor 10 and its passivity is satisfied, the inequality (13) is equivalently satisfied, which results in showing the asymptotic stability of the joint displacement q.

Therefore, if E is computed by the passivity monitor 10 and it is evaluated that the monitored system 2 is passive, it is found that the asymptotic stability of the output y of the monitored system 2 is also guaranteed.

On the other hand, if the monitored system 2 is not passive, the stability of the output y of the monitored system 2 is not necessarily guaranteed, and it is evaluated that as the output E from the passivity monitor 10 becomes smaller, the monitored system 2 further generates energy and becomes more unstable.

Moreover, $E_0$ in inequality (7), which is a threshold for determining whether the system becomes stable or unstable, is a value to be arbitrarily set by the user and is such a quantity having a clear physical meaning that is the initial internal energy of the monitored system 2, and hence can be quantitatively evaluated. Similarly, also the constant $E_{pmax}$ of weight tuning strategy, expressed by inequality (12) is such a quantity having a clear physical meaning that is the upper limit of internal energy of the monitored system 2 of PD control and hence can be quantitatively evaluated.

[Guarantee of Stability by Software Limiter]

Next, the guarantee of the stability of output of the monitored system by the software limiter will be described. The whole control system in which the first to fourth software limiters (21a, 21b to 24a, 24b) are applied to the control system in FIG. 1 is shown separately in FIG. 6 and FIG. 7. Moreover, a control system in which not only the first software limiters but also the second software limiters (22a, 22b) are applied to the control system in FIG. 1 is shown in FIG. 3; a control system in which the third software limiters (23a, 23b) are applied to the control system in FIG. 1 is shown in FIG. 4; and a control system in which the third and the fourth software limiters (23a, 23b, 24a, 24b) are applied to the control system in FIG. 1 is shown in FIG. 5, respectively.

The connection of the respective software limiters will be described on the basis of FIG. 6 and FIG. 7. The first software limiters are shown in FIG. 7 and are connected in the manner as described above. The second to fourth software limiters will be described. These also include weight tuning strategies (22a to 24a) and weights $W_v$, $W_{usr}$, and $W_{int}$ (22b to 24b) which are determined and controlled by the weight tuning strategies (22a to 24a). To each of the weight tuning strategies (22a to 24a) is inputted the output E of the passivity monitor 10. To the respective weights $W_v$, $W_{usr}$ and $W_{int}$ are inputted the output y from the user's controlled object 3, the control input $u_{int}$ from the user's control strategy 5, and the control input $u_{int}$ from the internal control strategy 4. The output of each of the weights $W_v$, $W_{usr}$, and $W_{int}$ is inputted to the user's controlled object 3. Here, the output from the weight $W_{usr}$ and the output from the weight $W_{int}$ are inputted to the user's controlled object 3 by the same physical means as shown in FIG. 6 or by different physical means as shown in FIG. 3 to FIG. 5.

In the control system 1 shown in FIG. 6 and FIG. 7, the input u to the user's controlled object 3 is expressed as follows, $$u = W_{usr} u_{usr} + W_{int} u_{int} - W_v y + u_{dis} \quad (14)$$

where $u_{usr}$ is an n-dimensional vector showing a control input from the user's control strategy 5; y is an n-dimensional vector showing an output from the monitored system 2; $u_{dis}$ is an n-dimensional vector showing an input torque from disturbance; $W_v$ is the tuning factor 22b (weight) of the second software limiters (22a, 22b) of the present invention; $W_{usx}$ is the tuning factor 23b (weight) of the third software limiters (23a, 23b) of the present invention; and $W_{int}$ is the tuning factor 24b (weight) of the fourth software limiters (24a, 24b) of the present invention. Each of the above $W_v$, $W_{usx}$, and $W_{int}$ is a diagonal matrix with n rows and n columns and the tuning strategy of the weight $W_{int}$ is expressed by the following equation.

$$W_{usr} + W_{int} = I \quad (15)$$

where I is a unit matrix with n rows and n columns. At this time, the following equation is obtained from equations (6), (7), (14), and (15).

$$\int_0^t y^T W_{usr}(u_{usr} - u_{int}) d\tau + \int_0^t y^T U_{dis} d\tau \le \quad (16)$$
$$E_0 + \int_0^t y^T u d\tau + \int_0^t y^T W_v y d\tau$$

This equation is equivalent to equation (7) and hence if this inequality is satisfied, the passivity of the monitored system 2 is satisfied. Now, the user's controlled object 3 is a robot and passivity holds between the input and the output for the robot, and hence the second term on the right side is limited by a lower limit as shown by inequality (1). Hence, even if a condition where equation (16) is not satisfied occurs, if a tuning strategy that makes $W_{usr}$ get asymptotically close to 0 is selected as the tuning strategy of the weight $W_{usr}$ and a tuning strategy that asymptotically increases $W_v$ is selected as the tuning strategy of the weight $W_v$, the weights $W_{usr}$ and $W_v$ that satisfy inequality (16) surely exist with the passage of time because all values except for time t are bounded. If these $W_{usr}$ and $W_v$ are set at the weights of limiters, inequality (16) is satisfied. That is, this is equivalent to the monitored system 2 being passive. When the monitored system 2 is passive, as described above, the asymptotic stability of the output y of the monitored system 2 is guaranteed by the internal control strategy 4. Therefore, it has been shown that the asymptotic stability of the output y of the monitored system 2 is guaranteed by the software limiters.

Here, this does not say that if a user's controlled object is not a user's controlled object like a robot in which passivity holds between the input and the output, the passivity of the monitored system is not shown, but even if a user's controlled object does not satisfy passivity, if inequality (16) can be satisfied by tuning $W_{usr}$ and $W_v$, the passivity of the monitored system holds without problem.

By updating the internal control strategy 4 and the user's control strategy 5 in the form of including $W_v$, $W_{usr}$, and $W_{int}$ (21b to 24b), which are tuned in the above-described manner by the weight tuning strategies (21a to 24a) of the software limiters, as gains, the weight tuning strategies (21a to 24a) can be used as automatic gain tuning mechanisms capable of always securing asymptotic stability. With this, it is possible to tune a gain appropriately without depending on trial and error and without causing instability.

2. Second Embodiment

Next, a virtual power limiter system that is newly defined by generalizing a system including the above-described passivity monitor and software limiters and guarantees the stability of a control system will be described.

First, a virtual power monitor (corresponding to the passivity monitor 10 of the first embodiment), which is one constituent element of the virtual power limiter system of the present invention, will be described.

Figure 8:
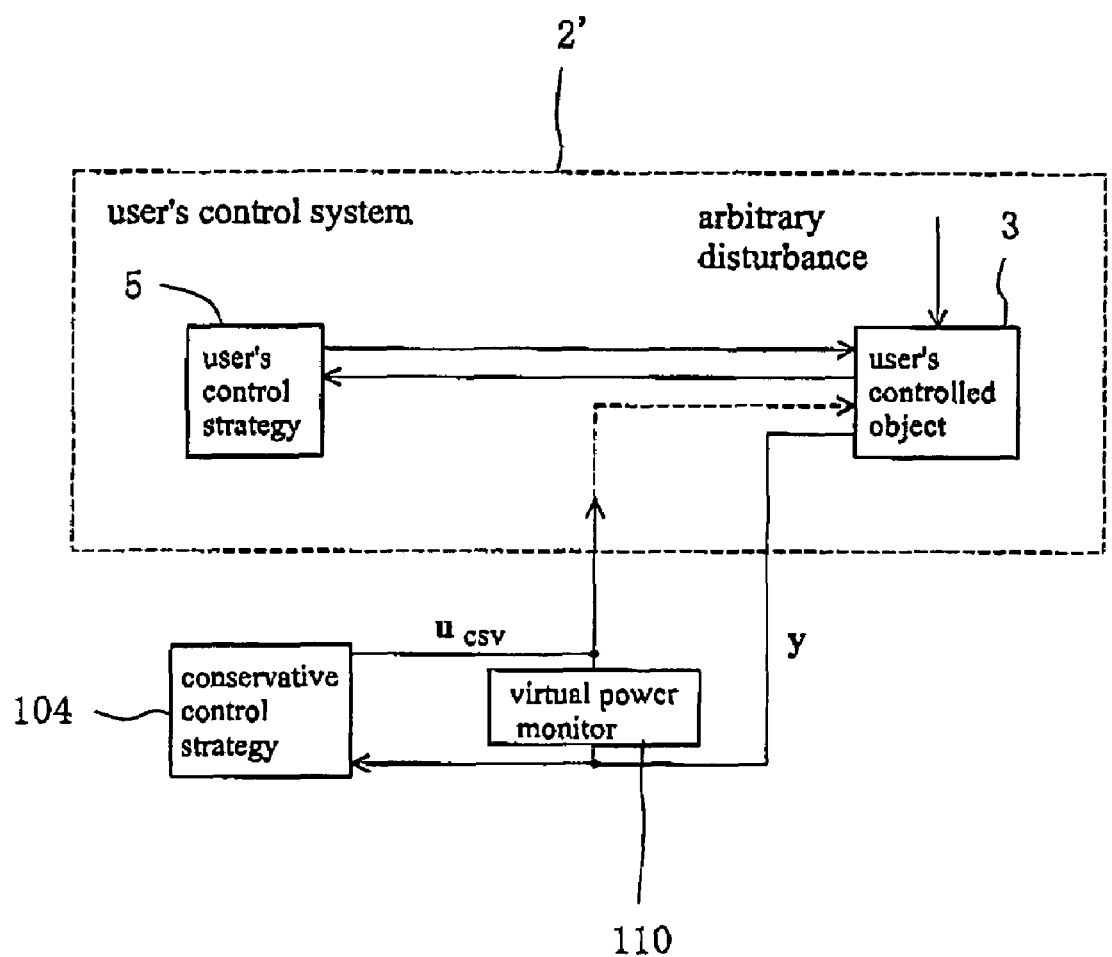
FIG. 8 is a conceptual diagram of a virtual power monitor system of the present invention.

In FIG. 8 is shown a user's control system 2' having a virtual power monitor 110 added thereto. Assume that a control input from a conservative control strategy 104, which is designed separately from the user's control strategy 5, is $u_{csv}$(t). The control input $u_{csv}$ from the conservative control strategy 104 does not need to be necessarily inputted in reality to the user's controlled object 3 but is virtually connected to the user's controlled object 3.

Here, the quantity of monitoring by the virtual power monitor 110 is defined as the following equation.

$$P_v(t) = y(t) u_{csv}(t) \quad (17)$$

This $P_v$ is the power virtually transmitted from the conservative control strategy 104 to the user's control object 3. However, this power is not necessarily a physical quantity expressed by [W]. The stability of the user's control system 2' can be evaluated from the result of monitoring $P_v$ of the virtual power monitor.

Moreover, a virtual power limiter (corresponding to the software limiter in the first embodiment), which is another important element constructing the virtual power limiter system of the present invention, will be described.

Figure 9:
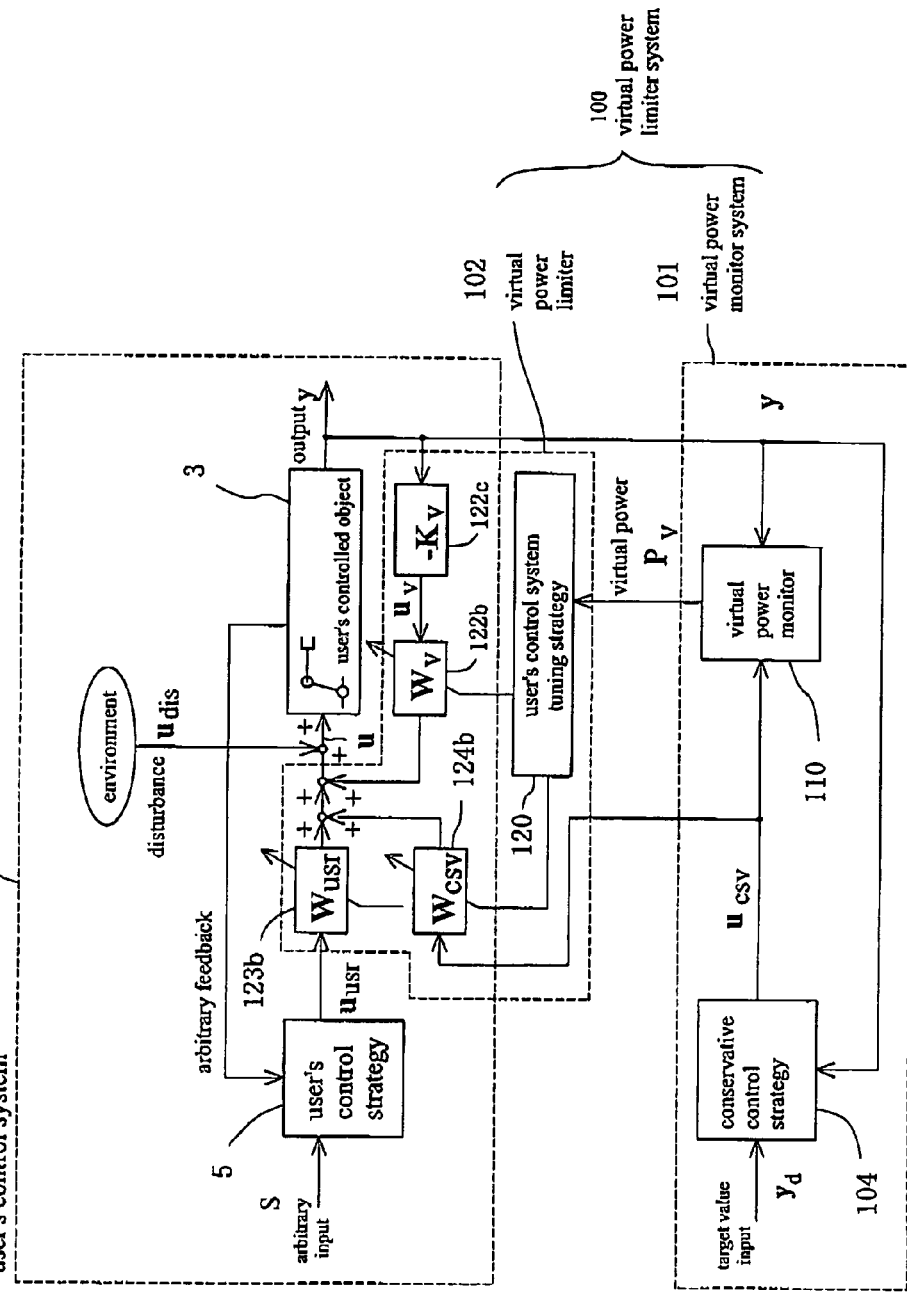
FIG. 9 is a diagram showing one example in which a virtual power limiter system of the present invention is added to a user's control system.

In FIG. 9 is shown a conceptual diagram of a virtual power limiter system 100. A virtual power limiter 102 tunes the user's control system 2' on the basis of the quantity of monitoring $P_v$ to thereby guarantee the stability of the user's control system 2'. In this embodiment, the virtual power limiter 102 is constructed of respective weights 122b, 123b, and 124b ($W_v$, $W_{usr}$, and $W_{csv}$) and a weight tuning strategy (corresponding to a user's control system tuning strategy in the drawing) 120.

Next, it will be shown that the virtual power limiter system 100, which is designed as one embodiment of the present invention on the basis of the concept of passivity, can guarantee the stability of the user's control system 2'. Here, the passivity is defined by equation (1).

First, to evaluate the stability of the user's control system 2', let's think about the following quantity computed by the quantity of monitoring $P_v$, $$E_v(t) = \int_0^t P_v(\tau) d\tau = \int_0^t y^T(\tau) u_{csv}(\tau) d\tau \quad (18)$$

where $E_v$ is energy virtually transmitted from the conservative control strategy 104 to the user's control system 2'. Moreover, the following inequality is introduced as the evaluation criterion of the stability of the user's control system 2'. Here, $E_{v0}$ is an arbitrary constant previously determined.

$$E_v(t) = \int_0^t y^T(\tau) u_{csv}(\tau) d\tau \geq -E_{v0} \quad (19)$$

Here, the state where the above inequality does not hold physically means that the user's control system 2' generates energy and where power excessively flows out. At this time, by adopting one of strategies of 1) increasing the internal dissipated energy or 2) decreasing the internal generated energy for the user's control system 2', the user's control system 2' can be tuned in the direction in which the inequality (19) is satisfied.

To realize the first strategy, it is thought that a tunable energy dissipating element is added to the inside of the user's control system 2' to increase the dissipated energy. To realize the second strategy, it is thought to decrease the generated energy by making the user's control strategy 5, which has a high possibility of being an energy generating element, a more conservative control strategy.

The virtual power limiter applies the above strategy according to the quantity of monitoring $P_v$ to limit power flowing out of the user's control system 2'. If the user's control system 2' can be tuned in such a way that the inequality (19) is always satisfied irrespective of whether or not the control input (manipulated variable) $u_{csv}$ is virtually inputted from the conservative control strategy 104, the whole system becomes a robust control system and has stability guaranteed.

[i] Case of Applying the Present Invention to a Robot Control System of a User's Control System]

An example of applying the virtual power limiter system 100 of the present invention to a robot control system will be described. FIG. 9 shown above is a block diagram showing its configuration example. Here, assume that the detail of the user's control strategy 5 and the dynamic characteristics of robot hardware as the user's controlled object 3 are unknown. However, assume that each joint velocity y(t) of the robot can be measured by a sensor and that a control input $u_{usr}$(t) from the user's control strategy to each corresponding joint actuator can be tuned. Here, y and $u_{csv}$ are a conjugate pair.

A driving force u actually applied to the robot hardware is as follows, $$u = W_{usr} u_{usr} + u_{dis} + W_{csv} u_{csv} + W_v u_v \quad (20)$$

where $u_{dis}$(t) is an unknown input such as disturbance, $u_v$(t)=$-K_v$ y(t) is a negative output feedback connected to the user's controlled object, and $K_v$ is a positive diagonal matrix of its gain.

By the way, although equation (20) corresponds to equation (14), when compared with each other, both equations are different from each other in expression relating to the weight $W_v$. This is because the elements of the above-described matrix $K_v$ of the gain are already included in the weight $W_v$ in the expression by equation (14), whereas the elements of the matrix $K_v$ of gain are not included in the weight $W_v$ in the expression by equation (20), that is, the elements of the matrix $K_v$ are separated from the weight $W_v$ as shown by $u_v(t) = -K_v y(t)$.

Therefore, in FIG. 3 and FIG. 6 showing the first embodiment of the present invention, only the block 22b of the weight $W_v$ is shown at the point of negative output feedback connected between the input and the output of the user's controlled object, whereas in FIGS. 9 to 16 showing the second embodiment of the present invention, not only the block 122b of the weight $W_v$ but also the block 122c of the gain $-K_v$ of the negative output feedback is shown at the point of negative output feedback connected between the input and the output of the user's controlled object.

Here, each of $W_{usr}(P_v)$, $W_{csv}(P_v)$ and $W_v(P_v)$ is a positive diagonal matrix expressing a variable weight constructing a virtual power limiter. The diagonal elements of $W_{usr}$, $W_{csv}$ are not less than 0 and not more than 1 and $W_{csv} = I - W_{usr}$, where I is a unit matrix.

As the conservative control strategy 104, for example, the following each shaft PD control is selected, $$u_{csv} = -K_p(q - q_d) - K_d y \quad (21)$$

where $K_p$ and $K_d$ are positive diagonal matrixes and $q_d$ is the target value command of each joint displacement and is fundamentally made to agree with a target value command to the user's control strategy.

At this time, from equation (20), the evaluation criterion (19) of stability becomes equivalent to the following inequality.

$$\int_0^t y^T w_{usr}(u_{usr} - u_{crv}) d\tau + \int_0^t y^T u_{dis} d\tau \leq \quad (22)$$
$$E_{v0} + \int_0^t y^T u d\tau + \int_0^t y^T w_v K_y y d\tau$$

From the above inequality, it is found that when a state where inequality (19) is not satisfied is detected by monitoring $P_v$, by bringing $W_{usr}$ close to 0 and by increasing $W_v$, the user's control system 2' can be tuned in a such way that inequality (19) is satisfied.

If inequality (19) is always satisfied by suppressing the effect $y^T u_{dis}$ of unknown disturbance and the effect $y^T u$ of unknown dynamic characteristics of the robot hardware, the dissipation of output of the whole system is shown by each shaft PD control strategy (21) and the stability of the unknown robot control system can be guaranteed.

[ii] Case of Applying the Present Invention to Power Assist System]

Moreover, an example will be described in which the virtual power limiter system of the present invention is applied to a power assist system (corresponding to the above-described user's control system 2') for assisting human power by the use of the same robot as described above. It is said that the conventionally known power assist system is generally hard to guarantee stability because an unknown dynamic characteristic of a human is included in a feedback loop. However, if the present invention is applied to the power assist system, in spite of the fact that the dynamic characteristics of the human is unknown, it is possible to restrict power flowing out to the human from the power assist system and hence to secure safety for the human by a virtual power limiter.

Figure 10:
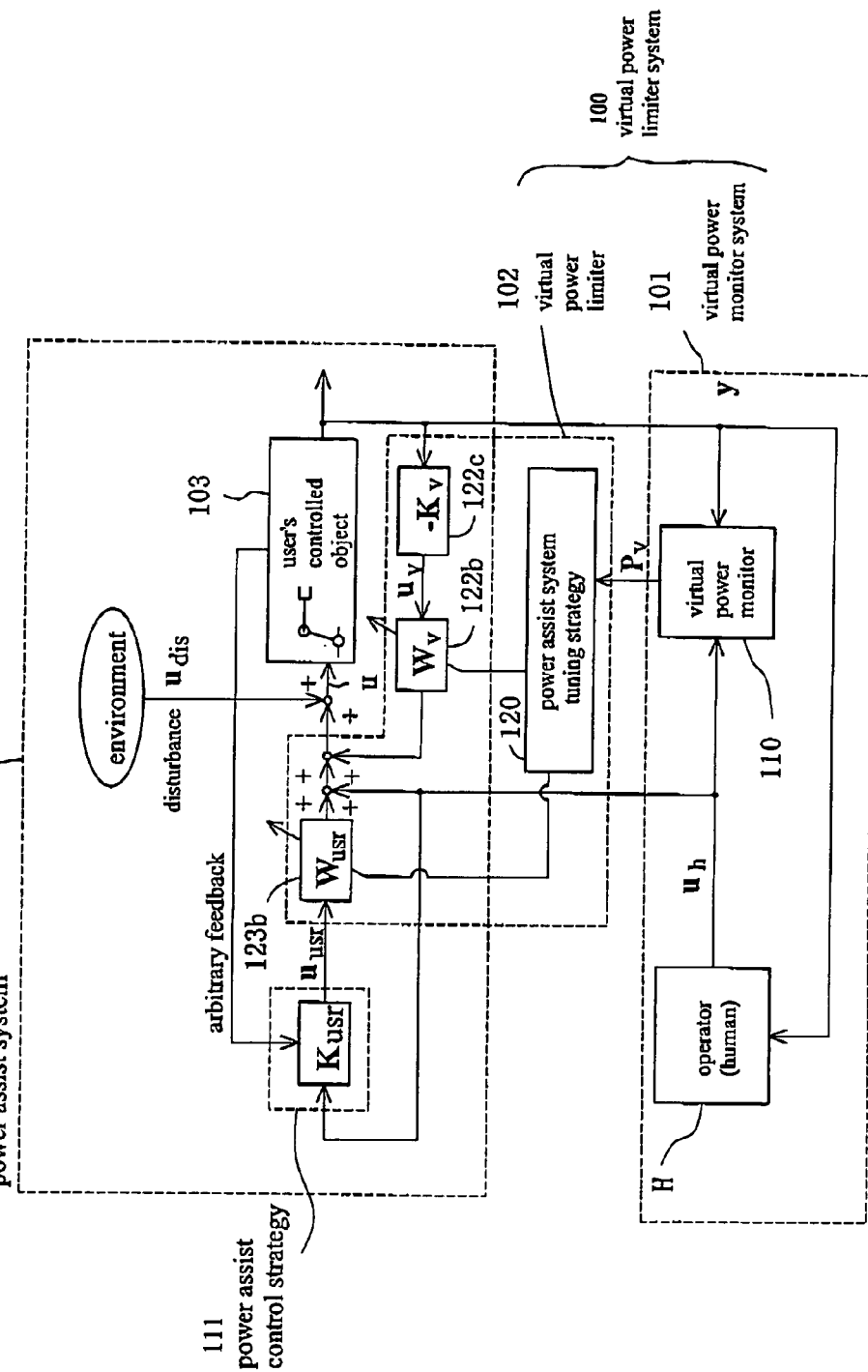
FIG. 10 is a diagram showing one example in which the virtual power limiter system of the present invention is added to a power assist system.

FIG. 10 is a block diagram showing one example to which the virtual power limiter system 100 of the present invention is applied to a power assist system 150.

When the present invention is applied to the power assist system 150, the operating force of the human shown in the following is used as the conservative control strategy 104.

$$u_{csv} = u_h \quad (23)$$

This is an operating force applied directly to a power assist robot 103 (corresponding to the above-described user's controlled object 3) by the human. Since the human (operator H) is connected mechanically directly to the power assist robot 103, virtual connection is not applicable and hence the weight of the virtual power limiter $W_{csv} = I$. In this embodiment, assume that the simplest power assist control strategy, as shown in the following, is used for the user's control strategy (corresponding to 111 in FIG. 10, hereafter referred to as "power assist control strategy" in the case where the present invention is applied to the power assist system 150). Other higher power assist control strategy may be used.

$$u_{usx} = K_{usr} u_h \quad (24)$$

where $K_{usr}$ is a positive diagonal matrix expressing a power assist gain. By substituting these into equation (20), the driving force applied to the power assist robot 103 is expressed by the following equation.

$$u = u_h + W_{usr} K_{usr} u_h + u_{dis} + W_v u_v \quad (25)$$

From this equation (25), the evaluation criterion (19) of stability becomes equivalent to the following equation.

$$\int_0^t y^T w_{usr} K_{usr} u_h d\tau + \int_0^t y^T u_{dis} d\tau \leq \quad (26)$$
$$E_{v0} + \int_0^t y^T u d\tau + \int_0^t y^T w_v K_y y d\tau$$

Therefore, it is clear that also in the case of the power assist system, by bringing the weight $W_{usr}$ of the virtual power limiter close to 0 and by increasing $W_v$, the power assist system can be tuned so that equation (19) is satisfied. This corresponds to the realization of automatic gain tuning of preventing power assist from being unstable by the virtual power limiter system 100.

In this manner, according to the present embodiment, it is possible to limit power flowing out to the human (operator H) from the power assist system 150 irrespective of human dynamic characteristics being unknown and hence to secure safety to the human by the virtual power limiter.

In this regard, in the respective examples of the above-described embodiments i) and ii), even if the passivity of the robot hardware (3, 103) is not necessarily supposed, when the virtual power limiter system 100 is designed on the basis of the concept of passivity, if only inequality (22) and inequality (26) are satisfied by tuning variable weights 122b, 123b, and 124b ($W_v$, $W_{usr}$, $W_{csv}$, here, in the case of power assist system 150, $W_{csv} = I$), it is possible to guarantee stability also for user's controlled object which is not passive.

Here, assume that when the virtual power limiter system 100 of the present invention is applied to the user 5 control system as shown in FIG. 9, the tuning strategy of the respective weights is a user's control system tuning strategy 120 and that when the virtual power limiter system 100 of the present invention is applied to the power assist system as shown in FIG. 10, the weight tuning strategy of the respective weights is a power assist system tuning strategy 120'.

Embodiment 1

[Various User's Control Systems to Which the Virtual Power Limiter System is Applied]

Hereafter, one embodiment of the present invention will be described with reference to the accompanying drawings.

Here, in the descriptions of the respective following examples, the same parts as in FIG. 1 to FIG. 10 are denoted by the same reference symbols and the like.

FIRST EXAMPLE

Basic Application

Figure 11:
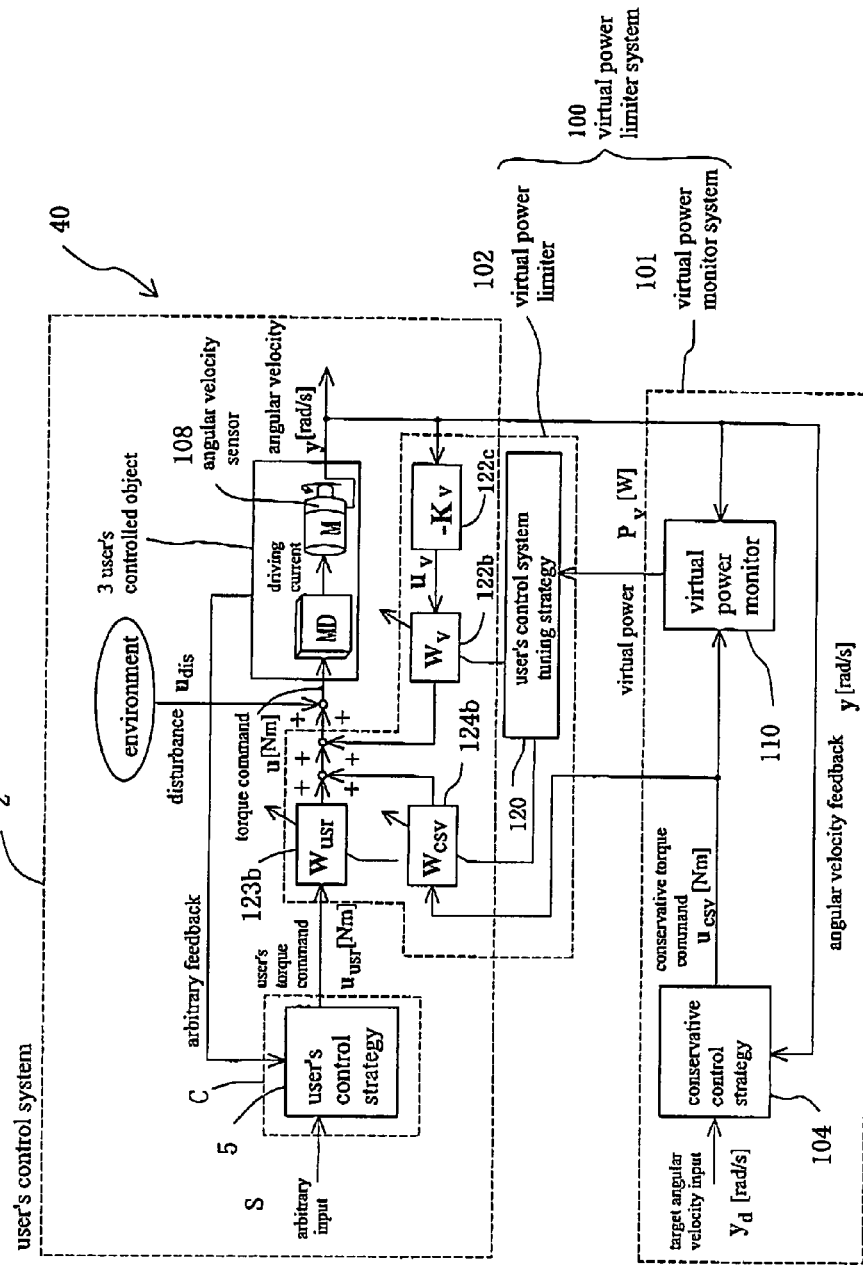
FIG. 11 is a diagram showing one embodiment of the present invention.
Figure 12:
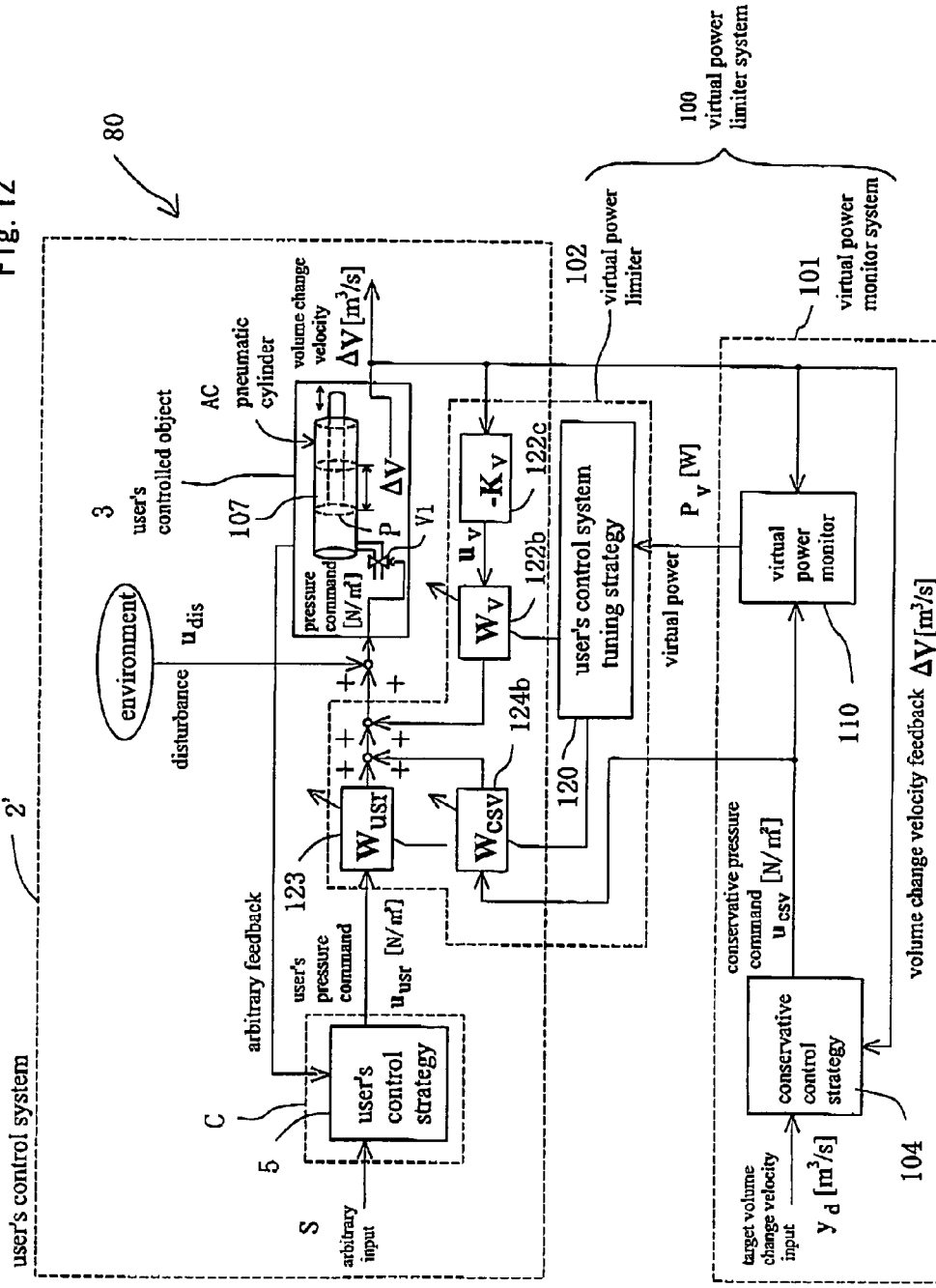
FIG. 12 is a diagram showing another embodiment of the present invention.

FIG. 11 is a block diagram showing one example of a motor control system to which the virtual power limiter system of the present invention is applied. FIG. 12 is a block diagram showing one example of a pneumatic cylinder system to which the virtual power limiter system of the present invention is applied.

A motor control system 40 shown in FIG. 11 includes: a motor M and a motor driver MD, which become the user's controlled object 3; a controller C which is open to the user and is used for inputting a command from the user's control strategy 5 to the motor M; and the virtual power limiter system 100 of the present invention. Here, a commercially available motor driver can be appropriately used as the motor driver MD.

The virtual power limiter system 100 includes a virtual power monitor system 101 and a virtual power limiter 102 and is constructed in the form of hardware made of an analog or digital electronic circuit, in the form of software including a program stored in an arithmetic unit of a microcomputer or the like, or in the form of combination of these. The system configuration and the other details of the virtual power limiter system 100 are the same as those described on the basis of FIG. 8 and FIG. 9 in the second embodiment i). To the user's control strategy 5 in the controller C are inputted an arbitrary input S from the user and an arbitrary feedback from the output of the motor M. Moreover, to the virtual power limiter system 100 are inputted the user torque command $u_{usr}$ from the user's control strategy 5, the input $y_d$ to the conservative control strategy 104, and the output information y of the motor M. A torque command u is inputted to the user's controlled object 3 from the virtual power limiter system 100. In this example, the output information y of the motor M is the angular velocity of the motor and information obtained by an angular velocity sensor 108 using a publicly known encoder, tachometer or the like is fed back to the virtual power monitor system 101 and the virtual power limiter 102. Moreover, in this example, the input $y_d$ to the conservative control strategy 104 is a target angular velocity.

The virtual power limiter 102 includes the user's control system tuning strategy 120 and the weights 122b to 124b ($W_v$, $W_{usr}$, and $W_{csv}$) tuned by the user's control system tuning strategy 120. Moreover, the user's control system tuning strategy 120 is connected to the output $P_v$ of the virtual power monitor 110. To the weights 122b to 124b ($W_v$, $W_{usr}$, and $W_{csv}$) are inputted the output y of an object to be tuned, the user torque command $u_{usr}$ from the user's control strategy 5, and the control input $u_{csv}$ from the conservative control strategy 104.

The configuration of a pneumatic cylinder system 80 shown in FIG. 12 is also the same as that of a motor control system 40 shown in FIG. 11. Here, the user's controlled object 3 is a pneumatic cylinder AC and respective commands are pressure commands. Positive or negative pressure proportional to a pressure command value (current) is applied to the pneumatic cylinder AC from a valve V1 to extend or contract a piston P.

In this example, the output information y of the pneumatic cylinder AC is the volume change velocity $\Delta V$ of the cylinder and the information of the volume change velocity $\Delta V$ is appropriately fed back to the virtual power monitor system 101 and the virtual power limiter 102 by a sensor 107. Moreover, in this example, the input $y_d$ to the conservative control strategy 104 is a target volume change velocity.

Next, the operation of the motor control system 40 in accordance with this example will be described with reference to FIG. 11.

First, the user inputs a control input (arbitrary input S), for example, relating to the angular velocity of the motor with time on a horizontal axis from the controller C. Usually, if the user's control system 2' is in a stable state, the user torque command $u_{usr}$ by the user's control strategy 5, which is outputted from the controller C, is applied as an input to the user's controlled object 3 (torque command) $u=u_{usr}$ to the motor driver MD without being subjected to a new processing in the virtual power limiter system 100, whereby the motor M is controlled and operated. At this time, the weight 123b ($W_{usr}$) of the virtual power limiter 102 is $W_{usr}=1$. In this manner, if the stability of the user's control system 2' is held only by $u_{usr}$, the control input $u_{csv}$ from the conservative control strategy 104 is not necessarily inputted to the motor M. Therefore, if the input $u_{usr}$ by the user' control strategy 5 does not need the control input $u_{usr}$ from the conservative control strategy 104 and the user's control system 2' is stable, the role of the conservative control strategy 104 can be limited to inputting the control input $u_{csv}$ to the virtual power monitor 110 by setting the weight 124b ($W_{csv}$) to 0. Even in this case, the output information y of the motor M and the control input $u_{csv}$ from the conservative control strategy 104 are inputted to the virtual power monitor 110 and the virtual power monitor 110 keeps monitoring the stability of the user's control system 2'.

On the other hand, when the user's control system 2' becomes unstable, if the virtual power limiter 102 is appropriately operated, the output y of the user's control system 2' can be made asymptotically stable. In response to the output $P_v$ of the virtual power monitor 110, the virtual power limiter 102 operates the user's control system tuning strategy 120 connected to the virtual power monitor 110 and then determine the respective weights 122b to 124b ($W_v$, $W_{usr}$ and $W_{csv}$) to make the output y of the user's control system 2' stable while keeping control.

In this manner, according to the motor control system 40 in accordance with the present invention, it is possible to always guarantee the asymptotical stability of the output y of the user's control system 2'.

SECOND EXAMPLE

Applications to Electric/Electronic Control System

Figure 13:
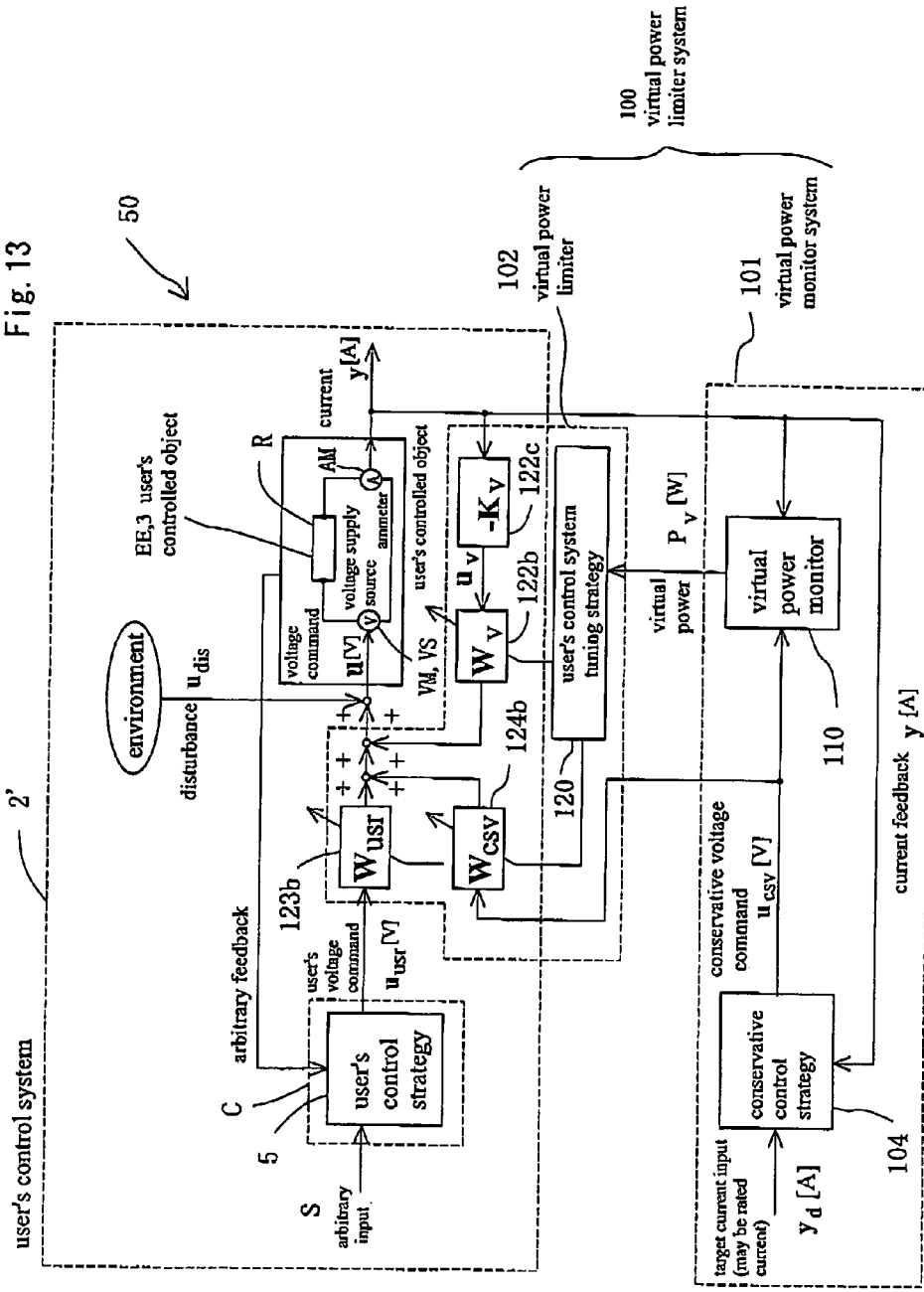
FIG. 13 is a diagram showing still another embodiment of the present invention.

FIG. 13 shows one example to which the present invention is applied to an electric/electronic control system. The electric/electronic control system is not necessarily limited to a system for controlling a rotary electric machine as shown in the first example, but can be assumed to be other various systems such as a power supply system for communications.

An electric/electronic control system 50 in accordance with this second example includes: an electric/electronic controlled object EE to become the user's controlled object 3; a controller C which is open to the user and is used for inputting a command from the user's control strategy 5 to the electric/electronic controlled object EE; and the virtual power limiter system 100 of the present invention. The electric/electronic controlled object EE includes a control voltage source VS, an ammeter AM, and a desired load R. The virtual power limiter system 100 includes the virtual power monitor 101 and the virtual power limiter 102 and, as is the case with the first example, is constructed of hardware, software, or a combination of them.

The basic configuration and operation of the electric/electronic control system 50 in accordance with the second example is the same as those of the motor control system 40 in the first example.

The control voltage source VS is controlled according to an input (voltage command) u to the user's controlled object 3 from the virtual power limiter system 100 to tune current passing through the desired load R. Current y passing through the desired load R is detected by the ammeter AM or a shunt resistance and is inputted to the gain 122c ($-K_y$) of the negative output feedback, the conservative control strategy 104, and the virtual power monitor 110 in the virtual power limiter system 100. At the same time, the virtual power monitor system 110 has also inputted the control input $u_{csv}$ from the conservative control strategy 104 and monitors the stability of the user's control system 2' by the use of y and $u_{csv}$.

To the user's control strategy S in the controller C are inputted an arbitrary input S from the user and an arbitrary feedback from the output of the electric/electronic controlled object EE. Moreover, to the virtual power limiter system 100 are inputted the user's voltage command $u_{usr}$ from the user's control strategy 5, the input $y_d$ to the conservative control strategy 104, and the output information y of the electric/electronic controlled object EE. Moreover, in this example, the input $y_d$ to the conservative control strategy 104 is a target current. The target current value is, for example, a rated current value.

Next, the operation of the electric/electronic control system 50 in accordance with this second example will be described with reference to FIG. 13.

Usually, if the electric/electronic control system 50 is in a stable state, the user's voltage command $u_{usr}$ from the controller C is inputted to the control voltage source VS as a voltage command $u=u_{usr}$ to the user's controlled object 3 without being subjected to any new processing in the virtual power limiter system 100, whereby the electric/electronic controlled object EE is controlled. That is, when a current output passing through the desired load R is not sufficient, the user's voltage command $u_{usr}$ is increased by the feedback control between the user's control strategy 5 and the electric/electronic controlled object EE to increase the voltage command u to the electric/electronic controlled object EE to increase the current output, whereas when a current output is excessive, the user's voltage command $u_{usr}$ is decreased to decrease the voltage command u to the electric/electronic controlled object EE to decrease the current output.

On the other hand, when the user's control system 2' becomes unstable, if the virtual power limiter 102 is appropriately operated, the output y of the user's control system 2' can be made asymptotically stable. In response to the output $P_v$ of the virtual power monitor 110, the virtual power limiter 102 operates the user's control system tuning strategy 120 connected to the virtual power monitor 110 and then determine the respective weights 122b to 124b ($W_v$, $W_{usr}$, and $W_{csv}$) to make the output y of the user's control system 2' stable while keeping control. Here, the user's control system tuning strategy 120 is a tuning strategy of the respective weights of the virtual power limiter 102.

In this manner, according to the electric/electronic control system 50 in accordance with the present invention, it is possible to always guarantee the asymptotical stability of the output y of the user's control system 2'.

THIRD EXAMPLE

[Case Where Some Control Inputs to be Inputted to the User's Controlled Object are Inputted by Different Physical Means]

A motor control system 60 in accordance with this example is a system in which to brake or assist a main motor MM, a secondary motor SM physically connected to the output shaft of the main motor MM via torque transmitting means and a secondary motor driver SD electrically connected to the secondary motor SM are added to the motor control system in the first example. Here, in this example, the secondary motor SM and the secondary motor driver SD construct part of the virtual power limiter 102. Hereafter, FIG. 14 will be mainly described.

Configuration

Figure 14:
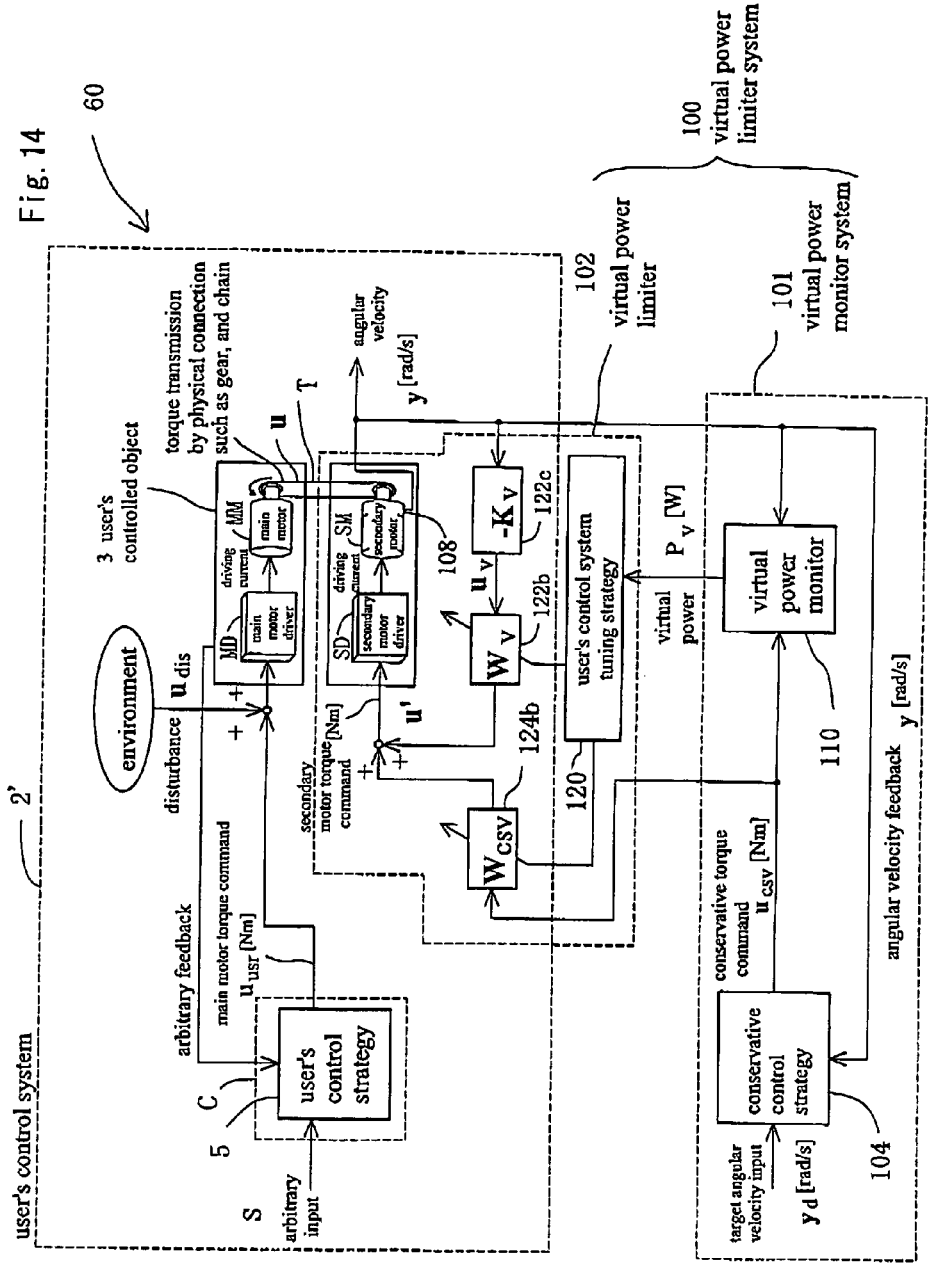
FIG. 14 is a diagram showing still another embodiment of the present invention.

FIG. 14 is a block diagram showing one example of the motor control system to which some control inputs are inputted to the user's controlled object 3 by different physical means. Also the motor control system 60 in accordance with this example, as is the case with the motor control system 40 in accordance with the first example, includes: the main motor MM and the main motor driver MD, which become the user's controlled object 3; the controller C which is open to the user and is used for inputting a command from the user's control strategy 5 to the main motor MM; and the virtual power limiter system 100 of the present invention.

The virtual power limiter system 100, as is the cases with the respective examples, includes the virtual power monitor system 101 and the virtual power limiter 102. In the case of this example, the virtual power limiter 102 includes: the user's control system tuning strategy 120 connected to the virtual power monitor 110 and the respective weights 122b and 124b ($W_v$, $W_{csv}$) connected to this virtual power monitor 110, the secondary motor SM, and the secondary motor driver SD. To the user's control strategy 5 in the controller C are inputted an arbitrary input S from the user and an arbitrary feedback from the output of the main motor MM. To the virtual power limiter system 100 are inputted an input $y_d$ to the conservative control strategy 104 and the output information y of the main motor MM. In this example, the input $y_d$ to the conservative control strategy 104 is a target angular velocity.

In the first example and the second example, as is clear by referring to FIG. 11 to FIG. 13, the control input $u_{usr}$ to the user's controlled object 3 from the user's control strategy 5 and the control input $u_{csv}$ to the user's controlled object 3 from the conservative control strategy 104 are processed in the virtual power limiter 102 before they are inputted to the user's controlled object 3 and hence one command value is inputted to the user's controlled object 3. Therefore, the control input from the conservative control strategy 104 and the control input from the user's control strategy 5 are inputted to the user's controlled object 3 by the same physical means.

On the other hand, in this example, the control input from the conservative control strategy 104 and the control input from the user's control strategy 5 are inputted to the user's controlled object 3 by different physical means, as will be described below.

That is, i) the control input $u_{usr}$ is directly inputted from the user's control strategy 5 to the main motor driver MD of the main motor MM, which is the user's controlled object 3, ii) whereas the control input $u_{csv}$ is subjected to weight 124b ($W_{csv}$) and then is combined with of a signal from another weight 122b ($W_y$) (negative feedback signal of the output y from the user's control system 2') and is inputted in the form this combined signal (secondary motor torque command) u' to the secondary motor driver SD of the secondary motor SM different from the main motor MM. This secondary motor torque command u' is converted to a mechanical control input u via the secondary motor driver SD and the secondary motor SM and then is inputted to the output shaft side of the main motor MM of the user's controlled object 3 via mechanical means like torque transmitting means T.

In this manner, in this example, the control input from the conservative control strategy 104 and the control input from the user's control strategy 5 are inputted to the user's controlled object 3 by different physical means.

Moreover, in this example, 1) the signal of the output y from the user's controlled object 3 is taken out of the rotary shaft side of the secondary motor SM, which is mechanically coupled to the output shaft of the main motor MM via the torque transmitting means T and is rotated at the number of revolutions corresponding to the number of revolutions of the output shaft of the main motor MM.

Moreover, in this example, 2) the weight $W_{usr}$ of the virtual power limiter provided between the user's control strategy 5 and the user's controlled object 3 is omitted.

In this manner, in this example, an electrical direct connection does not exist between the user's controlled object 3 and the virtual power limiter system 100, but only a mechanical connection including the secondary motor driver SD, the secondary motor SM, and the torque transmitting means T exist between them.

Operation

Hereafter, the operation of the motor control system 60 in accordance with this third example will be described.

First, the operation and action of the secondary motor SM will be described.

The secondary motor SM can brake the main motor MM and can function as the main motor MM in place of it under conditions where the main motor MM has its motion limited by some circumstances.

In the case of braking the main motor MM, for example, the value of the output y of the user's control system 2' is measured and, if necessary, a control input produced by subjecting the output y of the user's control system 2' to a negative feedback (the gain 122c ($-K_y$) of a negative output feedback) and the weight $W_y$ is combined with the control input $u_{csv}$, which is outputted from the conservative control strategy 104 and is subjected to the weight $W_{csv}$ to obtain a secondary motor torque command u' and then the obtained secondary motor torque command u' is inputted to the secondary motor driver SD. Then, torque in the direction opposite to the rotational direction of the main motor MM is applied to the output shaft of the main motor MM from the secondary motor SM on the basis of the secondary motor torque command u' to apply mechanical braking to the main motor MM.

On the other hand, the control input $u_{csv}$ from the conservative control strategy 104 is also inputted (in the form of the secondary motor torque command u') to the secondary motor driver SD. Hence, for example, under the conditions where an internal factor or an external factor causes some trouble in the main motor MM to stop the main motor MM, a main control strategy is shifted from the user's control strategy 5 to the conservative control strategy 104 to drive the secondary motor SM on the basis of the conservative control strategy 104 to make the secondary motor SM temporarily alternatively perform a function to be performed by the main motor MM.

The main motor MM and the secondary motor SM are physically connected to each other by a torque transmitting means T made of, for example, a chain and torque can be transmitted between them. In this example, the secondary motor driver SD drives the secondary motor SM on the basis of the secondary motor torque command u'. For example, according to the inputted secondary motor torque command u', 1) torque in a direction opposite to the rotational direction of the main motor MM is applied to the secondary motor SM to brake the rotation of the main motor MM; or 2) on the basis of the conservative control strategy 104, the secondary motor SM can act as the main motor MM in place of it under conditions where the main motor MM has its rotation limited.

Next, the operation of the whole motor control system 60 in accordance with this third example will be described with reference to FIG. 14.

Usually, if the user's control system 2' is in a stable state, the main motor MM is controlled and operated on the basis of the user's torque command $u_{usr}$ outputted from the controller C. If the stability of the user's control system 2' is kept only by the $u_{usr}$, the control input $u_{csv}$ from the conservative control strategy 104 is not necessarily inputted to the main motor MM via the secondary motor SM. Hence, if the user's torque command $u_{usr}$ by the user's control strategy 5 does not need the control input $u_{usr}$ from the conservative control strategy 104 and the user's control system 2' is in the stable state, the role of the conservative control strategy 104 can be limited to the inputting of the control input $u_{csv}$ to the virtual power monitor 110 by setting the weight 124b ($W_{csv}$)=0. Even in this case, the output information y of the main motor MM and the control input $u_{csv}$ from the conservative control strategy 104 are inputted to the virtual power monitor 110 and the virtual power monitor 110 keeps monitoring the stability of the user's control system 2'.

On the other hand, when the user's control system 2' is brought to an unstable state, the user's control system tuning strategy 120 and the respective weights 122b, 124b ($W_y$, $W_{csv}$) connected to it are appropriately operated and the secondary motor torque command u' is inputted to the secondary motor driver SD to operate the secondary motor SM. With this, for example, 1) torque in the direction opposite to the rotational direction of the main motor MM is applied to the output shaft of the main motor MM via the torque transmitting means T, or 2) under conditions where the main motor MM has its rotation limited, the secondary motor SM is driven on the basis of the conservative control strategy 104 in such a way as to act as the main motor MM in place of it, whereby the output y of the user's control system 2' can be made asymptotically stable. In response to the output $P_y$ of the virtual power monitor 110, the virtual power limiter 102 operates the user's control system tuning strategy 120 connected to the virtual power monitor 110 and then determine the weights 122b and 124b ($W_y$, $W_{csv}$) to make the output y of the user's control system 2' stable while keeping control.

In this manner, according to the motor control system 60 in accordance with this example, it is possible to always guarantee the asymptotical stability of the output y of the user's control system 2', by the action of the virtual power limiter system 100.

Fourth Embodiment

Application to Robot System

Figure 15:
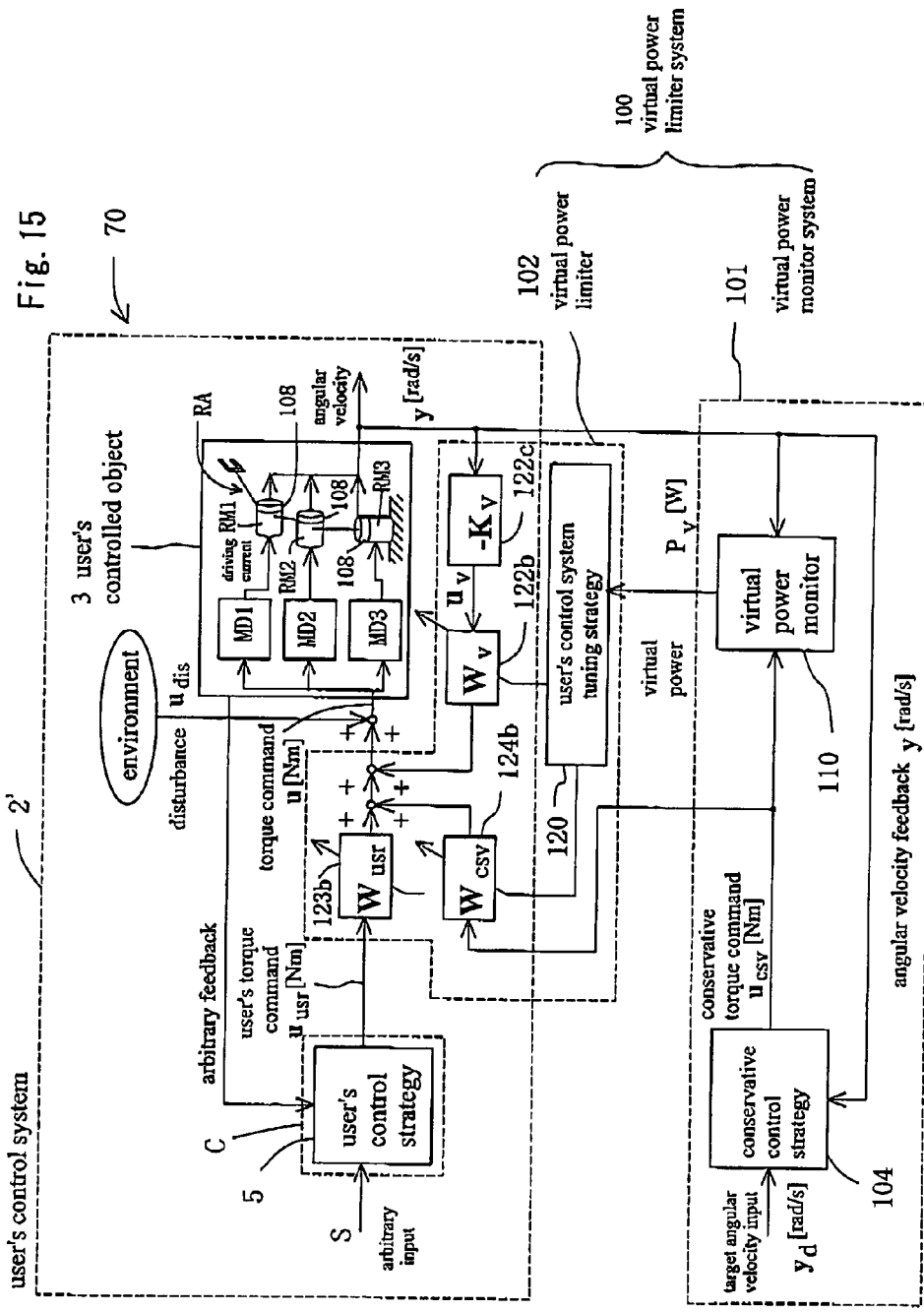
FIG. 15 is a diagram showing still another embodiment of the present invention.

Next, an example in which the virtual power limiter system of the present invention is applied to a robot system having a plurality of joints and having motors RM1 to RM3 at the respective joints will be described as an example for controlling a plurality of motor systems by mainly referring to FIG. 15. Such a robot system can be practically applied to, for example, automobile assembling robots and welding robots. As shown in FIG. 15, a robot system 70 in accordance with this fourth example includes a robot arm RA to become the user's controlled object 3, the controller C that is open to the user and is used for inputting the user's command from the user's control strategy 5 to the robot arm RA, and the virtual power limiter system 100 of the present invention.

The virtual power limiter system 100 includes the virtual power monitor system 101 and the virtual power limiter 102 and is constructed in the form of hardware made of an analog or digital electronic circuit, in the form of software of a program stored in an arithmetic unit of a microcomputer or the like, or in the form of the combination of them.

Moreover, the robot arm RA includes the driving motors RM1 to RM3 for the respective joints and motor drivers MD1 to MD3 that receive a torque command vector u from the virtual power limiter system 100 and drive these motors. Hence, in this example, $u_{usr}$, u, y, $y_d$ and the like shown in FIG. 15 are three-dimensional vectors for the respective motors. Here, the input $y_d$ to the conservative strategy 104 is a target angular velocity.

The basic configuration and operation of the internal control block of a robot system 70 in accordance with this fourth example is the same as that of the motor control system 40 in the first example, but this fourth example is different in that one virtual power limiter system 100 controls three motors RM1 to RM3. That is, a torque command u to the user's controlled object 3 or the output information y (angular velocity output) from the user's controlled object 3 is inputted to the motor drivers MD1 to MD3 or outputted from the motors RM1 to RM3, respectively, and the respective weights 122b to 124b ($W_v$, $W_{usr}$, and $W_{csv}$) of the virtual power limiter 102 are not scalars but diagonal matrixes. Here, the weight 122b ($W_v$) is a diagonal matrix $W_v$=diag($W_{vi}$) ($W_{vi} \geq 0$), the weight 123b ($W_{usr}$) is a diagonal matrix $W_{usr}$=diag($W_{usri}$) ($0 \leq W_{usri} \leq 1$), and the weight 124b ($W_{csv}$) is a diagonal matrix $W_{csv}$=diag($W_{csvi}$) ($0 \leq W_{csvi} \leq 1$).

Hereafter, the operation of the robot system 70 in accordance with this fourth example will be described. First, one virtual power monitor 110 is provided and monitors power $P_v$ virtually transmitted from the conservative control strategy 104 to the user's controlled object 3 to evaluate and analyze the stability of the output y of the user's control system 2'. To the virtual power monitor 110 are inputted the control input $u_{csv}$ from the conservative strategy 104 and the output information y from the respective motors (RM1 to RM3).

Usually, if the user's control system 2' is in a stable state, the input $u_{usr}$ from the user's control strategy 5 given by the controller C is directly inputted to the respective motor drivers MD1 to MD3 as the torque command u=$u_{usr}$ to the user's controlled object 3 for the respective motors RM1 to RM3 without being subjected to any new processing in the virtual power limiter system 100, whereby the respective motor RM1 to RM3 are controlled and operated. At this time, the weight 123b ($W_{usr}$) of the virtual power limiter 102 is $W_{usr}$=1. In this manner, if the stability of the user's control system 2' is kept only by the $u_{usr}$, the control input $u_{csv}$ from the conservative control strategy 104 is not necessarily inputted to the user's controlled object 3. Hence, if the control input $u_{usr}$ from the user's control strategy 5 does not need the control input $u_{csv}$ from the conservative control strategy 104 and if the user's control system 2' is in the stable state, the role of the conservative control strategy 104 can be limited to the inputting of the control input $u_{csv}$ to the virtual power monitor 110 by setting the weight 124b ($W_{csv}$)=0.

On the other hand, when the user's control system 2' is brought to an unstable state, if the virtual power limiter 102 is appropriately operated, the output y of the user's control system 2' can be made asymptotically stable. At this time, since the respective weights 122b to 124b ($W_v$, $W_{usr}$ and $W_{csv}$) of the virtual power limiter 102 are matrixes, it is possible to independently apply weights to three motors RM1 to RM3, respectively. Hence, in this robot system 70, it is possible to determine the stability of the user's control system 2' as a whole by one virtual power monitor 110 and to change the degrees of limitation of energy of the respective controlled objects (three motors) of the user's controlled object 3, respectively. For example, it is also possible to make a tuning of setting only the weight of the motor RM1 close to the hand of the robot at a larger weight to minimize the fluctuations of the hand.

In this manner, according to this fourth example, it is possible to finely control the stability of the output y of the user's control system 2' including the plurality of motors. That is, since the respective weights 122b to 124b ($W_v$, $W_{usr}$, and $W_{csv}$) of the virtual power limiter 102 are not scalars but are expressed by matrixes, it is possible to set independent limiters for respective degrees of freedom (respective motors) and to perform appropriate control responsive to the situations of the respective motors.

Embodiment 2

[Power Assist Robot to Which the Virtual Power Limiter System is Applied]

Hereafter, a case where the virtual power limiter system of the present invention is applied to a power assist system constructed on the basis of the robot system shown in FIG. 15 will be described as an example in which the virtual power limiter system of the present invention is applied to a power assist system. The following description will be provided on the basis of FIG. 16.

Figure 16:
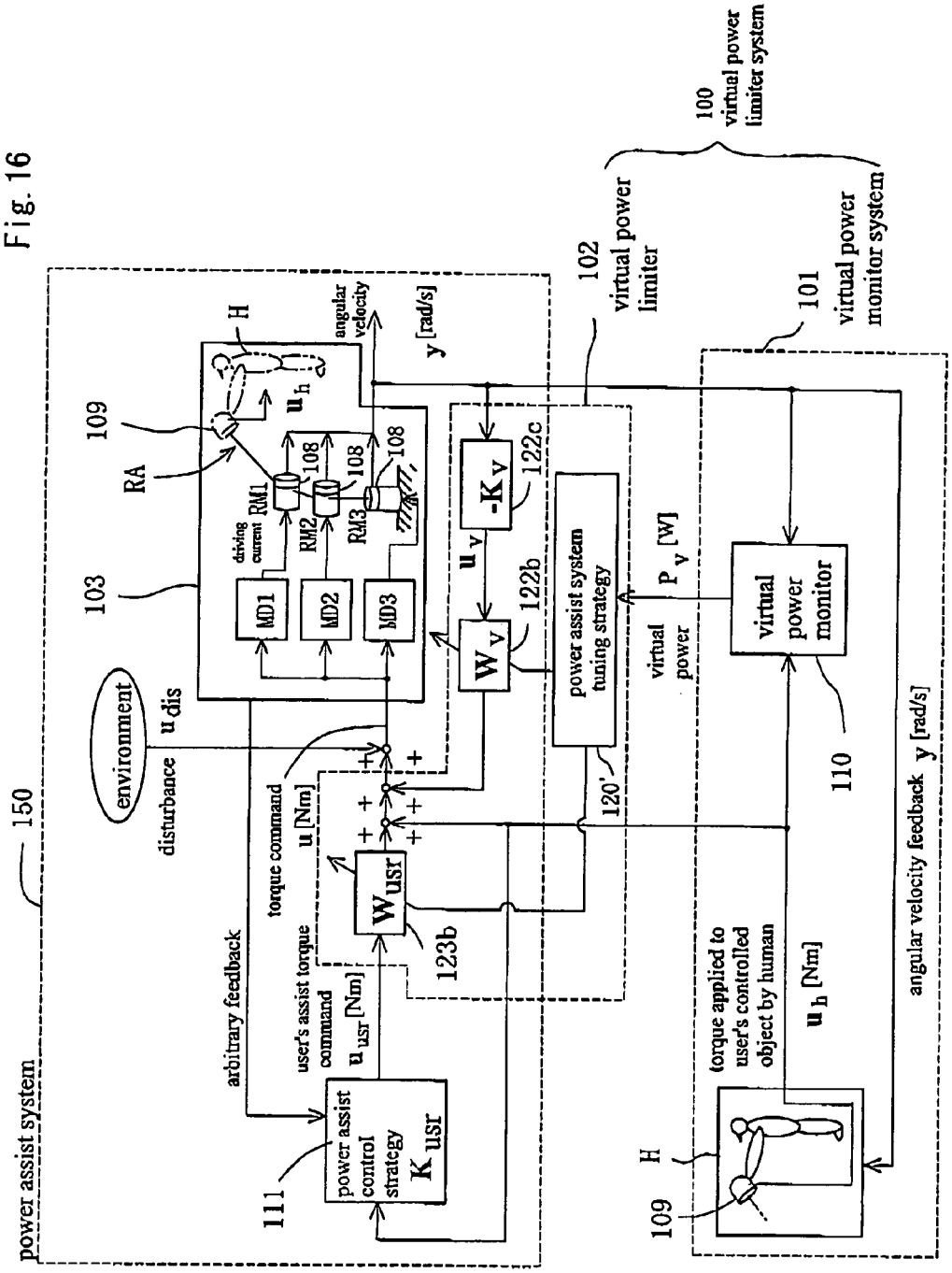
FIG. 16 is a diagram showing one embodiment in which the virtual power limiter system of the present invention is applied to a power assist system.
Figure 17:
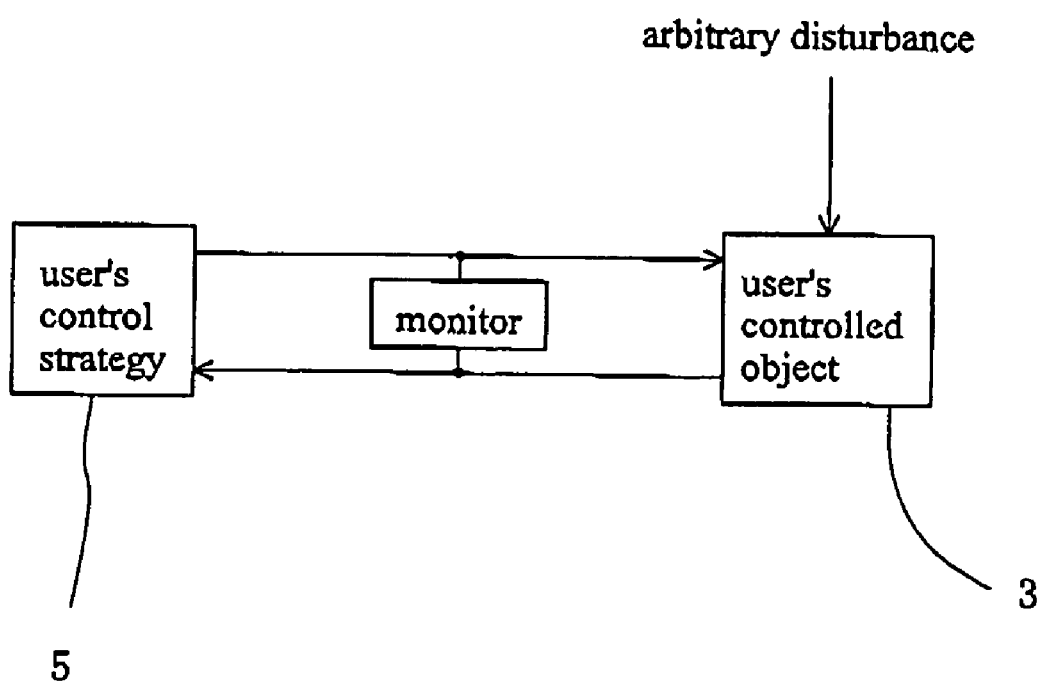
FIG. 17 is a diagram showing one example of the control system of the related art.

As shown in FIG. 16, the basic configuration of a power assist robot 103 of this embodiment 2 is the same as that of the user's controlled object 3 in accordance with the robot system 70 shown in FIG. 15, but is different in that the hand of the robot arm RA is directly operated by an operator H and in that its operation is assisted by the motors RM1 to RM3 arranged at the respective joints of the robot arm RA.

By the way, in the respective examples in the foregoing embodiment 1, in the case where the virtual power limiter system 100 of the present invention is applied to the user's control system 2', when the virtual power limiter 102 is designed, the conservative control strategy 104 is previously prepared by the use of calculation or the like.

On the other hand, in the power assist system 150 like this embodiment 2, the power assist robot 103 corresponding to the user's controlled object and the human of the operator H are mechanically connected to each other and a force sensor 109 is provided between both of them. Hence, when the virtual power limiter system 100 of the present invention is applied to the power assist system 150, by utilizing this force sensor 109 and by using the measurement value $u_h$ of this force sensor 109, the operation of the human can be regarded as the above-described conservative control strategy.

In this embodiment 2, as shown in FIG. 16, by using the measurement value $u_h$ (vector value) of a force applied to the robot RA by the operator H, which is obtained from the force sensor 109, the operation of the operator H is treated as a conservative control strategy.

Here, the configuration of the whole power assist system 150 is the same as shown in FIG. 10. In this embodiment 2, the magnitude of the force $u_h$ when the hand of the robot arm RA is operated by the operator H is detected by the force sensor 109 and the force $u_h$ is inputted to the power assist robot 103, the virtual power monitor 110, and the power assist control strategy 111.

Next, the action of the power assist robot 103 of this embodiment 2 will be described.

First, in the power assist robot 103 of this embodiment 2, a user assist torque command value is determined on the basis of the force $u_h$ applied to the robot arm RA by the operator H, the value of an angular velocity y, and the power assist control strategy $K_{usr}$. With this, a torque command u is actually inputted to the respective motor drivers MD1 to MD3 and the motors RM1 to RM3 and as a result, a driving force is applied to each of the motors RM1 to RM3 to assist the operation of the operator H. Other details are the same as those described in the second embodiment ii).

According to this embodiment 2, it is possible to limit power flowing out from the power assist robot 103 to the operator H irrespective of the dynamic characteristics of the operator H being unknown and hence to secure the safety of the operator H by the virtual power limiters 122b and 123b ($W_{usr}$ and $W_v$).

In this regard, the present invention is not necessarily limited to the configuration described in the respective above embodiments but can be variously changed in design and be modified in other ways.

For example, in the example relating to the motor control system and the robot system shown in FIG. 11 and the other drawings, the target value input $y_d$ to the conservative control strategy 104 is the angular velocity input, but the target value input $y_d$ may be, for example, a target value relating the rotational angle of the motor M or the like. Similarly, in the example relating to the pneumatic cylinder shown in FIG. 12, the target value input $y_d$ to the conservative control strategy 104 is the volume change velocity, but the target value input $y_d$ may be, for example, a physical quantity such as the rate of flow of air.

Moreover, the target value input $y_d$ is not necessarily set by the user, but it is also recommended that a fixed value be previously set as a desired fixed value in the conservative control strategy 104: for example, in the case of the current input shown in FIG. 13, a rated current or a zero current may be set, and in the case of the angular velocity input shown in FIG. 11 and the other drawings, a zero velocity may be set.

Further, the control command inputted to the conservative control strategy may be the same as the control command to be inputted to the user's control strategy but, for example, a command having a different unit and a different physical quantity may be inputted to the conservative control strategy.

Still further, the control command inputted to the conservative control strategy may be a more conservative control command as compared with the control command (arbitrary input S) to be inputted to the user's control strategy.

As to the more conservative control command like this, for example, if a target value input to be inputted to the conservative control strategy is a current input shown in FIG. 13, a command such as the above-described "rated current" and "zero current" may be used, whereas if a target value input to be inputted to the conservative control strategy is an angular velocity input shown in FIG. 11 and the other drawings, a command of "zero velocity" may be used.

In the configuration example shown in FIG. 13, the voltage applied from the control voltage source VS to the desired load R may be measured and displayed by a volt meter VM. Further, when the main motor MM is braked in the configuration example shown in FIG. 14, it is also recommended that the secondary motor SM be made a rotary electric machine to become also a generator and that the secondary motor driver SD be made, for example, a unit corresponding to an electronic load, and that the quantity of consumption of generated power obtained from both terminals of the secondary motor SM is tuned by changing the magnitude of the load to thereby perform the angular velocity control of the main motor MM. Still further, in the configuration example shown in FIG. 14, needless to say, not only the chain but also a belt, a gear or the like can be used as the torque transmitting means T.

INDUSTRIAL APPLICABILITY

The virtual power limiter system in accordance with the present invention can guarantee the stability of the output of the user's control system no matter what machine system and the like is an object, no matter what the environment of the machine system and the like is installed in, and no matter what control strategy is used by the user. For example, think a case where the virtual power limiter system of the present invention is applied to the robot arm, and assume that when a command of lifting an arm is issued, the arm becomes unstable and starts to vibrate. The conventional hardware limiter shuts current or brakes and hence the arm jerkily drops down or is fixed there. However, if the virtual power limiter system of the present invention is applied to the case, it is possible to keep an operation of lifting the arm while interrupting the unstable action. Hence, the virtual power limiter system of the present invention can be most suitably applied to machines of which particularly high control performance and sufficient stability and safety are required at the same time, for example, industrial robots, space robots, or electrically operated power steering gears, and further, power assist systems typified by a power assist robot or a power assist wheel chair. Moreover, the virtual power limiter system of the present invention can be constructed as software made of a program stored in the arithmetic unit of the microcomputer or the like and as hardware made of analog or digital circuits.

As described above in detail, it is clear that the present invention is a new and extremely useful invention to provide a system configuration that can evaluate the stability of the output of a user's control system including unknown dynamic characteristics and all effects of disturbances and can guarantee the stability of the output of the user's control system irrespective of the unknown dynamic characteristics and the disturbances.

The invention claimed is:

1. A control system comprising:
a user's control system;
a virtual power monitor system interconnected with said user's control system;
a bidirectional connection effecting said interconnection between said user's control system and said virtual power monitor system;

said user's control system including:
  a user's controlled object; and
  a user's control strategy unit which is connected to said user's controlled object and applies a user's control strategy unit input to control said user's controlled object; and
said virtual power monitor system including:
  a conservative control strategy unit which is connected to said user's controlled object and controls said user's controlled object conservatively though said bidirectional connection to effect a stable control;
  said bidirectional connection being configured to effect:
    connection of a user's controlled object output from said user's controlled object to said conservative control strategy; and
    a variable connection of a conservative control strategy unit input from said conservative control strategy unit to said user's controlled object such that said an amount of said conservative control strategy unit input applied to said user's controlled object is variable;
  a virtual power monitor which monitors a virtual power transmitted from said conservative control strategy unit to said user's controlled system by monitoring said bidirectional connection and calculating said virtual power as a scalar product of said user's controlled object output and said conservative control strategy unit input for said user's controlled object which is output from said conservative control strategy unit into said bidirectional connection, and such that said virtual power monitor system evaluates and analyzes stability of said user's controlled object output from said user's controlled object based on said calculating of said virtual power;
  said bidirectional connection varying said variable connection based on said virtual power calculated by said virtual power monitor; and
  a virtual power limiter controlling said variable connection and connected between said user's control strategy unit and said user's controlled object, and configured to tune a gain of said user's control strategy unit input applied to said user's controlled object based upon said virtual power monitored by said virtual power monitor, such that:
    said virtual power limiter tunes said gain automatically,
    said virtual power limiter limits the outflow of said virtual power from said user's controlled system to said conservative control strategy unit, and
    said virtual power limiter maintains stability of said user's controlled object output from said user's controlled object.

2. The control system of claim 1 further comprising said virtual power limiter controlling said variable connection and effecting negative feedback from said user's controlled object output to said user's controlled object input applied to said user's controlled object, and tuning a second gain of said negative feedback based on said virtual power monitored by said virtual power monitor, such that:
  said virtual power limiter tunes said second gain automatically,
  said virtual power limiter limits outflow of said virtual power from said user's control system to said conservative control strategy unit, and
  said virtual power limiter maintains the stability of said user's controlled object output from said user's controlled object.

3. The control system of claim 1 further comprising the virtual power limiter controlling said variable connection and being connected between said conservative control strategy unit and said user's controlled object, and tuning a second gain of said conservative control strategy unit input applied to said user's controlled object based upon said virtual power monitored by said virtual power monitor, such that:
  said virtual power limiter tunes said second gain automatically, and
  said virtual power limiter maintains stability of said user's controlled object output from said user's controlled object.

4. A control system comprising:
  a power assist system;
  a virtual power monitor system interconnected with said power assist system; and
  a bidirectional connection effecting said interconnection between said power assist system and said virtual power monitor system;
  said power assist system including:
    a user's controlled object controllable by a human input from a human operator; and
    a power assist control strategy unit connected to said user's controlled object and applying a power assist control strategy unit input to said user's controlled object to effect control of the user's controlled object such that said user's controlled object operates to effect at least one of:
      reduction of a physical load on said human operator; and
      amplification of a physical power of said human operator; and
  said virtual power monitor system including:
    human interconnection means accepting said human input from said human operator and producing a human input signal for controlling said user's controlled object voluntarily though said bidirectional connection;
    said bidirectional connection being configured to effect:
      connection of a physical controlled object output from said user's controlled object to said human operator; and
      a variable connection of said human input signal from said human interconnection means to said user's controlled object such that an amount of said human input signal applied to said user's controlled object is variable; and
    a virtual power monitor which monitors a virtual power transmitted from said human operator to said user's controlled object by monitoring said bidirectional connection and calculating said virtual power as a scalar product of said physical controlled object output and said human input signal for said user's controlled object which is output from said human interconnection means into said bidirectional connection such that said virtual power monitor system evaluates and analyzes stability of said physical controlled object output from said user's controlled object based on said calculating of said virtual power;
    said bidirectional connection varying said variable connection based on said virtual power calculated by said virtual power monitor; and
    a virtual power limiter controlling said variable connection and connected between said power assist control strategy unit and said user's controlled object, and said virtual power limiter being configured to effect a gain of said power assist control strategy unit input applied to said user's controlled object based on said virtual power monitored by said virtual power monitor, such that:

said virtual power limiter tunes said gain automatically, and said virtual power limiter limits outflow of said virtual power from said power assist system to said human operator so as to ensure operator safety.

5. The control system of claim 4 further comprising said virtual power limiter controlling negative feedback from said physical controlled object output and combined with said human input signal applied to said user's controlled object, and tuning a second gain of said negative feedback based on said virtual power monitored by said virtual power monitor, such that:

said virtual power limiter tunes said second gain automatically, and said virtual power limiter limits outflow of said virtual power from said power assist system to said human operator so as to ensure operator safety.

* * * * *